United States Patent
Parviz et al.

(10) Patent No.: US 12,459,981 B2
(45) Date of Patent: Nov. 4, 2025

(54) PRIMARY NK CAR CONSTRUCTS AND METHODS

(71) Applicant: ImmunityBio, Inc., San Diego, CA (US)

(72) Inventors: Fereshteh Parviz, San Diego, CA (US); Rohit Duggal, San Diego, CA (US)

(73) Assignee: ImmunityBio, Inc., San Diego, CA (US)

( * ) Notice: Subject to any disclaimer, the term of this patent is extended or adjusted under 35 U.S.C. 154(b) by 402 days.

(21) Appl. No.: 17/311,226

(22) PCT Filed: Nov. 26, 2019

(86) PCT No.: PCT/US2019/063454
§ 371 (c)(1),
(2) Date: Jun. 4, 2021

(87) PCT Pub. No.: WO2021/107940
PCT Pub. Date: Jun. 3, 2021

(65) Prior Publication Data
US 2022/0282216 A1 Sep. 8, 2022

(51) Int. Cl.
| | |
|---|---|
| *C07K 14/55* | (2006.01) |
| *A61K 40/15* | (2025.01) |
| *A61K 40/31* | (2025.01) |
| *A61K 40/42* | (2025.01) |
| *A61K 45/06* | (2006.01) |
| *C07K 14/705* | (2006.01) |
| *C07K 14/725* | (2006.01) |
| *C07K 16/28* | (2006.01) |
| *C12N 5/0783* | (2010.01) |
| *C12N 15/85* | (2006.01) |

(52) U.S. Cl.
CPC .............. *C07K 14/55* (2013.01); *A61K 40/15* (2025.01); *A61K 40/31* (2025.01); *A61K 40/421* (2025.01); *A61K 40/4234* (2025.01); *A61K 45/06* (2013.01); *C07K 14/7051* (2013.01); *C07K 14/70521* (2013.01); *C07K 16/2827* (2013.01); *C12N 5/0638* (2013.01); *C12N 5/0646* (2013.01); *C12N 15/85* (2013.01); *C07K 2317/622* (2013.01); *C07K 2317/732* (2013.01); *C07K 2319/03* (2013.01); *C07K 2319/33* (2013.01); *C12N 2510/00* (2013.01); *C12N 2830/001* (2013.01); *C12N 2830/50* (2013.01); *C12N 2840/203* (2013.01)

(58) Field of Classification Search
CPC .............. C07K 14/55; C07K 14/7051; C07K 14/70521; C07K 16/2827; C07K 2317/622; C07K 2317/732; C07K 2319/03; C07K 2319/33; C07K 2319/02; C07K 14/705; C07K 14/70535; C07K 14/70596; C07K 2319/74; C07K 2319/00; A61K 39/4613; A61K 39/4631; A61K 39/464411; A61K 39/46444; A61K 45/06; A61K 39/001111; A61K 39/00114; A61K 2039/5156; A61K 2121/00; A61K 2300/00; C12N 5/0638; C12N 5/0646; C12N 15/85; C12N 2510/00; C12N 2830/001; C12N 2830/50; C12N 2840/203; C12N 15/65; C12N 2800/107; C12N 5/06; C12N 5/10; C12N 15/62; A61P 35/00; A61P 35/04; A61P 35/02
See application file for complete search history.

(56) References Cited

U.S. PATENT DOCUMENTS

| | | | |
|---|---|---|---|
| 9,745,368 B2 | 8/2017 | Milone et al. | |
| 10,960,024 B2 * | 3/2021 | Klingemann | .... C07K 14/70596 |
| 11,077,143 B2 * | 8/2021 | Klingemann | ........ C12N 5/0646 |
| 11,547,727 B2 * | 1/2023 | Boissel | .......... A61K 39/464429 |
| 11,643,452 B2 * | 5/2023 | Boissel | .......... A61K 39/464474 424/93.21 |
| 2004/0018536 A1 | 1/2004 | Yanagawa et al. | |
| 2004/0076622 A1 | 4/2004 | Studeny et al. | |
| 2016/0046729 A1 | 2/2016 | Schönfeld et al. | |
| 2016/0281106 A1 | 9/2016 | Kim et al. | |
| 2016/0361360 A1 | 12/2016 | Chang et al. | |
| 2019/0336533 A1 | 11/2019 | Hwang et al. | |
| 2021/0198342 A1 * | 7/2021 | Boissel | .............. A61K 2239/38 |
| 2021/0293787 A1 * | 9/2021 | Schomer | ............ G01N 33/5029 |
| 2023/0272042 A1 * | 8/2023 | Boissel | ............ C07K 14/70517 424/93.21 |

FOREIGN PATENT DOCUMENTS

| | | |
|---|---|---|
| CA | 3113962 A1 | 5/2021 |
| CN | 107073138 A | 8/2017 |

(Continued)

OTHER PUBLICATIONS

Vajdos FF et al. Comprehensive functional maps of the antigen-binding site of an anti-ErbB2 antibody obtained with shotgun scanning mutagenesis. J Mol Biol. Jul. 5, 2002;320(2):415-28. doi: 10.1016/S0022-2836(02)00264-4. PMID: 12079396. (Year: 2002).*

(Continued)

*Primary Examiner* — Misook Yu
*Assistant Examiner* — Alec Jon Peters
(74) *Attorney, Agent, or Firm* — Umberg Zipser LLP; Martin Fessenmaier; Priti Phukan

(57) ABSTRACT

Disclosed herein are recombinant nucleic acids, comprising a 5' untranslated (5'-UTR) sequence portion, a signal peptide sequence portion, a single chain antibody fragment sequence portion, a hinge region sequence portion, a transmembrane domain sequence portion, and one or more intracellular domain sequence portions. Also disclosed herein are modified natural killer (NK) cells comprising the recombinant nucleic acid described above. Further disclosed herein are methods of treating a tumor in a subject by administering the modified NK cells.

4 Claims, 15 Drawing Sheets

Specification includes a Sequence Listing.

(56) References Cited

FOREIGN PATENT DOCUMENTS

| | | | |
|---|---|---|---|
| CN | 107708741 | A | 2/2018 |
| CN | 109219445 | A | 1/2019 |
| CN | 109419818 | A | 3/2019 |
| JP | 2002176987 | A | 6/2002 |
| JP | 2005531507 | A | 10/2005 |
| JP | 2016533769 | A | 11/2016 |
| WO | 2013/033626 | A2 | 3/2013 |
| WO | 2013/040371 | A2 | 3/2013 |
| WO | 2014/099671 | A1 | 6/2014 |
| WO | 2014145252 | A2 | 9/2014 |
| WO | 2016/201300 | A1 | 12/2016 |
| WO | 2018/013975 | A1 | 1/2018 |
| WO | 2019/082721 | A1 | 5/2019 |
| WO | 2019/101998 | A1 | 5/2019 |
| WO | 2019178580 | A1 | 9/2019 |
| WO | 2021/107940 | A1 | 6/2021 |

OTHER PUBLICATIONS

Brown M, et al. Tolerance of single, but not multiple, amino acid replacements in antibody VH CDR 2: a means of minimizing B cell wastage from somatic hypermutation? J Immunol. May 1, 1996;156(9):3285-91. PMID: 8617951. (Year: 1996).*
Extended European Search Report received for EP Patent Application Serial No. 19946247.4 dated Jul. 7, 2023, 7 pages.
First Office Action received for KR Patent Application Serial No. 10-2021-7011005 dated Jul. 18, 2023, 11 pages.
Notice of Allowance received for KR Patent Application Serial No. 10-2021-7011005 dated Jul. 18, 2023, 12 pages.
Notice of Eligibility received for SG Patent Application Serial No. 11202103528V dated Jan. 16, 2024, 04 pages.
Notice of Reason for Refusal received for JP Patent Application Serial No. 2021-520551 dated Oct. 13, 2023, 09 pages.
Second Office Action received for CN Patent Application Serial No. 201980067946.0 dated Oct. 19, 2023, 09 pages.
Search Report and Written Opinion received for Singapore Patent Application Serial No. 11202103528V dated May 10, 2022, 8 pages.
International Preliminary Report on Patentability received for PCT Application Serial No. PCT/US2019/063454 dated Jun. 9, 2022, 8 pages.
International Search Report and Written Opinion received for International PCT Application Serial No. PCT/US2019/063454 dated Aug. 14, 2020, 11 pages.
Examination Report No. 1 received for Australian Patent Application Serial No. 2019468311 dated Sep. 23, 2022, 7 pages.
Kruschinski et al., "Engineering Antigen-Specific Primary Human NK Cells against HER-2 Positive Carcinomas", Proceedings of the National Academy of Sciences of the United States of America, vol. 105, No. 45, 2008, pp. 17481-17486.
Notice of Reasons for Refusal received for Japanese Patent Application Serial No. 2021-520551 dated Mar. 3, 2023, 12 pages. (Including English Translation).
First Office Action received for Chinese Patent Application Serial No. 201980067946.0 dated Mar. 30, 2023, 34 pages. (Including English Translation).
Notice of Acceptance received for Australian Patent Application Serial No. 2019468311 dated May 9, 2023, 3 pages.
Notice of Acceptance received for Canadian Patent Application Serial No. 3,113,962 dated May 11, 2023, 1 page.
Office Action received for Canadian Patent Application Serial No. 3,113,962 dated Mar. 31, 2022, 5 pages.
Office Action issued for KR Application No. 10-2024-7019177 dated Aug. 26, 2024, 11 Pages (including English Translation).
Notice of Allowance received for KR Application No. 10-2024-7019177 dated Dec. 31, 2024, 12 Pages (including English Translation).
Notice of Allowance received for KR Application No. 10-2024-7008007 dated Mar. 19, 2024, 12 Pages (including English Translation).
Office Action received for Japanese Patent Application Serial No. 2021-520551 dated Jun. 28, 2024, 06 pages (Including English Translation).
Notice of Allowance received for Japanese Patent Application Serial No. 2021-520551 dated Dec. 17, 2024, 05 pages (Including English Translation).
Notice of Allowance received for Chinese Patent Application Serial No. 201980067946.0 dated Feb. 1, 2024, 04 pages. (Including English Translation).
Examination Report No. 1 for Australian Application No. 2023204206 dated Jan. 15, 2025. 2 pages.
Extended European Search Report dated Feb. 21, 2025.
Examinnation Report for IL Patent Application No. 282319 dated: May 21, 2025, 16 pages (including English Translation).

\* cited by examiner

PRIMARY NK CAR CONSTRUCTS AND METHODS

SEQUENCE LISTING

The content of the ASCII text file of the sequence listing named 104077.00016Pro_ST25, which is 42 KB in size was created on Nov. 6, 2019 and electronically submitted via EFS-Web along with the present application is incorporated by reference in its entirety.

FIELD OF THE INVENTION

The field of the invention is recombinant nucleic acids and cells containing the same, particularly as they relate to the treatment of cancer.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Cancer immunotherapies based on natural killer (NK) cells have had remarkable progress in recent years. NK cells are cytotoxic lymphocytes that constitute a significant component of the innate immune system. In most cases, NK cells represent about 4-10% of circulating lymphocytes, and bind and kill targeted cells, including virus-infected cells and many malignant cells. NK cell killing is non-specific with regard to particular antigens and can occur without prior immune sensitization. Killing of targeted cells is typically mediated by cytolytic proteins, including perforin, granzyme, and granulysin.

NK cells have been used as therapeutic entities. To that end, NK cells are isolated from the peripheral blood lymphocyte fraction of whole blood, expanded in cell culture to obtain sufficient numbers of cells, and then re-infused into a subject. NK cells have shown in at least some cases moderate effectiveness in both ex vivo therapy and in vivo treatment. However, cancers employ various tactics to delay, alter, or even stop anti-tumor immunity, leading to failures in the control of tumor growth.

The anti-tumor response of NK cells also faces a lot of limitations. First, the poor ability of NK cells to reach tumor tissues limits their application as therapies for solid tumors. This is a common problem of cellular immunotherapy strategies. Second, changes in NK cell-activating receptors and their ligands in tumors, may lead to a decreased therapeutic response and tumor progression. For example, high levels of NKG2D (Natural-killer Group 2, Member D) ligands are detected in the early stages of colorectal cancer, but their expression decreases as the disease progresses. Third, the tumor microenvironment (TME) remains a major barrier to the effectiveness of adoptively transferred NK cells. For example, tumor-infiltrating immune cells such as dendritic cells (DCs), suppressive or tolerogenic macrophages and regulatory T (Treg) cells as well as cancer-associated fibroblasts, which are embedded in the extracellular matrix, may meddle in NK cell activation either through secretion of immunosuppressive cytokines or by interfering with receptor expression.

Thus there remains a need in the art for technologies and methods for overcome the above problems and being able modify NK cells for specific targeting of cancer cells.

SUMMARY OF THE INVENTION

The inventive subject matter is directed to recombinant nucleic acids, comprising a T7 promoter sequence portion, a 5' untranslated (5'-UTR) sequence portion, a signal peptide sequence portion, a single chain antibody fragment sequence portion, a hinge region sequence portion, a transmembrane domain sequence portion, and one or more intracellular domain sequence portions. The recombinant nucleic acid may further comprises a sequence encoding CD64. Furthermore, the 5'-UTR sequence portion may further comprise a kozak sequence.

Preferably, the single chain antibody fragment sequence portion comprises a sequence encoding for a single chain variable fragment that is adapted to bind PDL1 antigen or other tumor antigens. In some embodiment, the recombinant nucleic acid may further comprise a sequence portion encoding CD16a and/or ER-IL2.

The hinge sequence portion provides range of motion for the single chain antibody fragment sequence portion, while the transmembrane domain sequence portion enables insertion of the recombinant nucleic acid to a membrane.

The intracellular domain sequence portion of the recombinant nucleic acid as disclosed herein is contemplated to comprise co-stimulatory or signaling sequence portions.

In one embodiment, the intracellular domain sequence portion comprises CD28 and/or CD3ζ. In another embodiment, the intracellular domain sequence portion comprises CD28 and/or FcεRIγ. The recombinant nucleic acid of any one of the preceding claims, Furthermore, the intracellular domain sequence portion may provide enhanced cytotoxic activity against tumor cells.

Preferably, the recombinant nucleic acid of this disclosure comprises a 3'-untranslated region (3'-UTR) and a poly-A sequence portion. The 3'-UTR sequence portion provides RNA stability and initiation of translation. The poly-A sequence portion preferably comprises at least 150 adenine nucleotides. The poly-A sequence portion provides RNA stability and initiation of translation.

The recombinant nucleic acid vector of this disclosure is preferably optimized to target a tumor antigen. In some embodiments, the recombinant nucleic acid has at least 90%, 91%, 92%, 93%, 94%, 95%, 96%, 97%, 98% or 99% identity to SEQ ID NO: 1. In other embodiments, the recombinant nucleic acid has at least 90%, 91%, 92%, 93%, 94%, 95%, 96%, 97%, 98% or 99% identity to SEQ ID NO: 2. In still other embodiments, the recombinant nucleic acid, has at least 90%, 91%, 92%, 93%, 94%, 95%, 96%, 97%, 98% or 99% identity to SEQ ID NO: 3. In still further embodiments, the recombinant nucleic acid, has at least 90%, 91%, 92%, 93%, 94%, 95%, 96%, 97%, 98% or 99% identity to SEQ ID NO: 4.

In another aspect of the inventive subject matter, the inventors have disclosed a modified NK cell comprising one or more nucleic acids encoding: a 5' untranslated (5'-UTR) sequence portion, a signal peptide sequence portion, a single chain antibody fragment sequence portion, a hinge region sequence portion, a transmembrane domain sequence portion, and one or more intracellular domain sequence portions; wherein the nucleic acid sequences are operably linked to each other as a single polynucleotide. This modified NK cell is contemplated to specifically target tumor cells.

In another aspect, the inventors have disclosed a method of generating modified NK cells or CAR-NK cells, comprising: transfecting a primary NK cell with a recombinant nucleic acid as disclosed above. Furthermore, a composition is also disclosed comprising the modified NK cell and a pharmaceutically acceptable excipient. Furthermore, the modified NK cell may be provided in a kit; for example the kit may comprise the NKcell as disclosed herein and instructions for use.

In yet another aspect, disclosed is a method of treating a cancer or a tumor in a subject, the method comprising administering to the subject a therapeutically effective amount of the modified NK cells or the composition comprising the modified NK cells, wherein administration treats the cancer or reduces the size of the tumor in the subject. A method of reducing cancer metastasis in a patient is also contemplated, wherein a subject having cancer metastasis is administered with a therapeutically effective amount of the modified NK cells or a composition comprising modified NK cells. Preferably, from $1\times10^3$ to $1\times10^{10}$, per m$^2$ of the NK cells are administered to the subject. The administration may be done parenterally, intravenously, peritumorally, or by infusion. The method may also comprise further administration to the subject an additional therapeutic agent.

In another embodiment, the inventors have disclosed a method of treating cancer in a patient in need thereof, comprising administering to the patient a therapeutically effective amount of any one of the genetically modified NK cells as disclosed herein, thereby treating the cancer. The method may further comprise a step of administering at least one additional therapeutic entity selected from the group consisting of a viral cancer vaccine, a bacterial cancer vaccine, a yeast cancer vaccine, N-803, an antibody, a stem cell transplant, and a tumor targeted cytokine. The cancer is selected from leukemia, acute lymphocytic leukemia, acute myelocytic leukemia, chronic leukemias, chronic myelocytic (granulocytic) leukemia, chronic lymphocytic leukemia, polycythemia vera, lymphomas, Hodgkin's disease, non-Hodgkin's disease, multiple myeloma, Waldenstrom's macroglobulinemia, heavy chain disease, solid tumors including, but not limited to, sarcomas and carcinomas such as fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyo sarcoma, colon carcinoma, pancreatic cancer, breast cancer, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, bronchogenic carcinoma, renal cell carcinoma, hepatoma, bile duct carcinoma, choriocarcinoma, seminoma, embryonal carcinoma, Wilm's tumor, cervical cancer, testicular tumor, lung carcinoma, small cell lung carcinoma, bladder carcinoma, epithelial carcinoma, glioma, astrocytoma, medulloblastoma, craniopharyngioma, ependymoma, pinealoma, hemangioblastoma, acoustic neuroma, oligodendroglioma, menangioma, melanoma, neuroblastoma and retinoblastoma.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
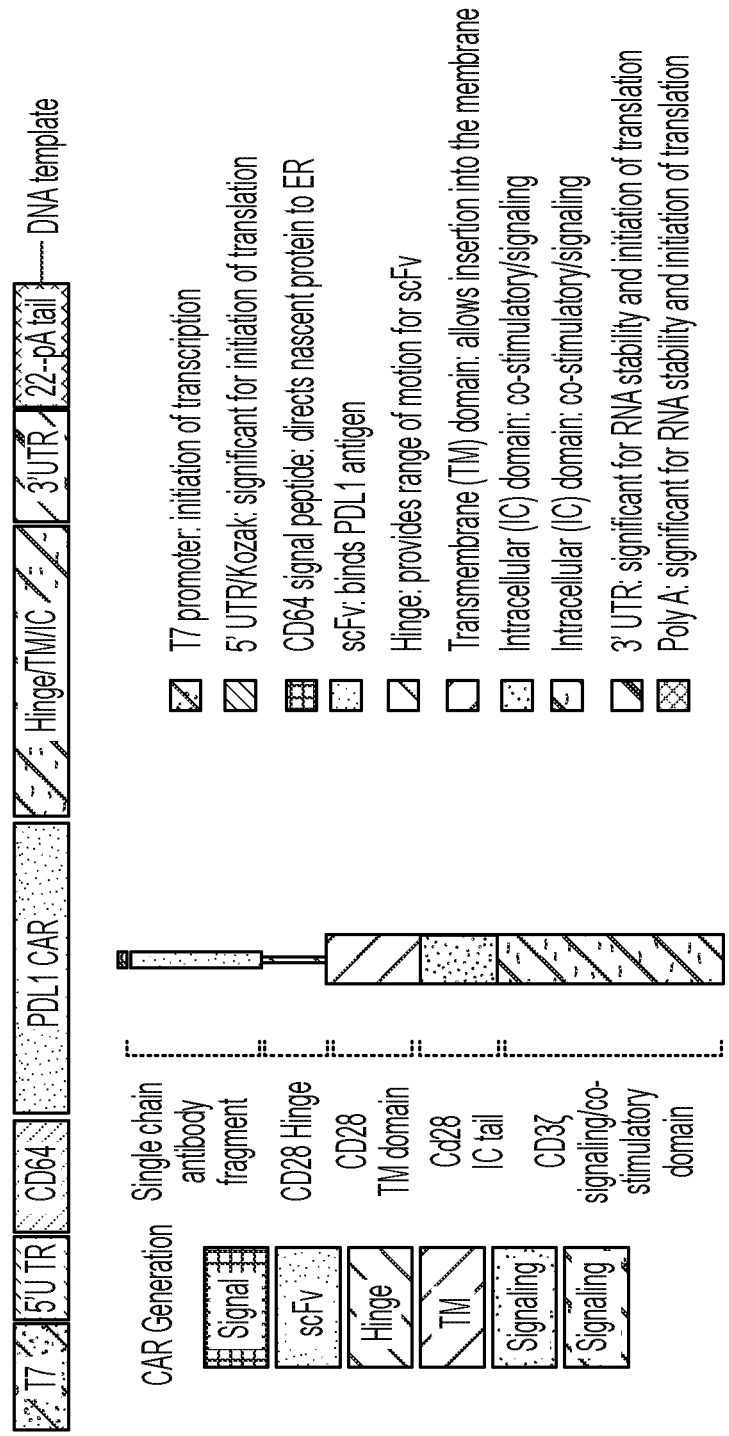
FIG. 1 depicts one embodiment of generation of a chimeric antigen targeted at PDL1 protein: pNBS-XL53.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. Unless defined otherwise, all technical and scientific terms used herein have the same meaning as commonly understood by one of ordinary skill in the art to which this invention belongs.

The inventors have disclosed herein various engineered NK cells as the basis to improve immunotherapies to cancer and tumors. Viewed from a different perspective, the inventors have disclosed nucleic acid constructs that target tumor antigens. Preferably, in some embodiments, the tumor antigen is PDL1. In one embodiment, these nucleic acid constructs may be chimeric antigen receptor constructs for transfecting primary NK cells to generate CAR-NK cells.

In one aspect of the inventive concept, the disclosure herein involves generation of a chimeric antigen RNA molecule (CAR) against PDL1 and potentially other tumor antigen targets. The RNA generated from these type of DNA constructs is contemplated to be delivered to natural killer cells for specific targeting of tumor cells.

In one embodiment, disclosed herein is a recombinant nucleic acid, comprising: a T7 promoter sequence portion, a 5' untranslated (5'-UTR) sequence portion, a signal peptide sequence portion, a single chain antibody fragment sequence portion, a hinge region sequence portion, a transmembrane domain sequence portion, and one or more intracellular domain sequence portions. In one embodiment, the recombinant nucleic acid comprises or consists of or consists essentially of an amino acid sequence having at least about 80%, 85%, 90%, 95%, 96%, 97%, 98%, or 99% sequence homology to the nucleotide sequence of SEQ ID NOs:1-4.

The recombinant nucleic acid construct of SEQ ID NO: 1, also referred to herein as XL53, is targeted against a PD1 ligand called PDL1. This molecule is designed for in vitro synthesis of an RNA molecule that would be delivered to natural killer cells for the purpose of immunotherapy in cancer patients. In vitro transcription can be initiated at the T7 promoter using the bacteriophage T7 RNA polymerase. The T7 promoter is flanked by a 42-bp untranslated sequence (5' UTR: 5' untranslated) that also contains a Kozak sequence upstream of the CAR gene. The secondary structure of the 5' UTR along with the Kozak sequence aid with the initiation of translation. A short signal peptide (15-amino acids) from the CD64 protein, marks the N-terminus of the CAR protein. The signal peptide is recognized by a signal recognition peptide (SRP) in the cytosol that delivers the nascent polypeptide chain from the cytosol to the endoplasmic reticulum. The PDL1 binding site is a heterodimer of variable light and heavy chain domains. The two domains are connected to each other via a 20-aa (amino acids) linker. This hinge and transmembrane domains of the molecule are derived from the CD28 protein. The hinge region provides range of motion and flexibility for the binding domain while the transmembrane region allows correct membrane insertion. The cytoplasmic domains of CD28 and CD3ζ are co-stimulatory domains engaged in intracellular signaling pathways that enhance cytotoxic activities of the transfected cells. At the 3' untranslated end of the construct, a 94-bp sequence from 3' UTR of Mus musculus hemoglobin alpha gene, further stabilizes the construct. This 3'UTR is followed by 22-bp polyA stretch. The combination of the 3' UTR and poly A confer stability to the RNA molecule. The main features of the construct of SEQ ID NO: 1 are that (a) it has a high binding affinity for the PDL1 protein; (b) it uses a combination of intracellular domains of CD28 and CD3ζ for enhanced cytotoxic activity against target cells; and (c) it is RNA based, so there is no concern regarding integration of the construct into the host genome.

FIG. 1 illustrates generation of a chimeric antigen targeted at PDL1 protein. The transcription of RNA is initiated by the T7 promoter. The 5'-UTR/Kozak region of nucleotides provides significant for initiation of translation. The nucleic acid sequence encoding he CD64 signal peptide is present in the 3' end of the UTR/Kozak region, and it directs nascent protein to ER. This is followed by scFv region, which binds PDL1 antigen. A hinge region is present next to the scFv region, and that provides a range of motion to the scFv. The hinge region is followed by a transmembrane domain that allows insertion of the nucleotide construct into the membrane. This is followed by one or more intracellular domains comprising co-stimulatory and/or signaling elements. Finally, the 3'-UTR and Poly-A regions are present to provide stability to the RNA as well as initiation of translation.

Figure 2:
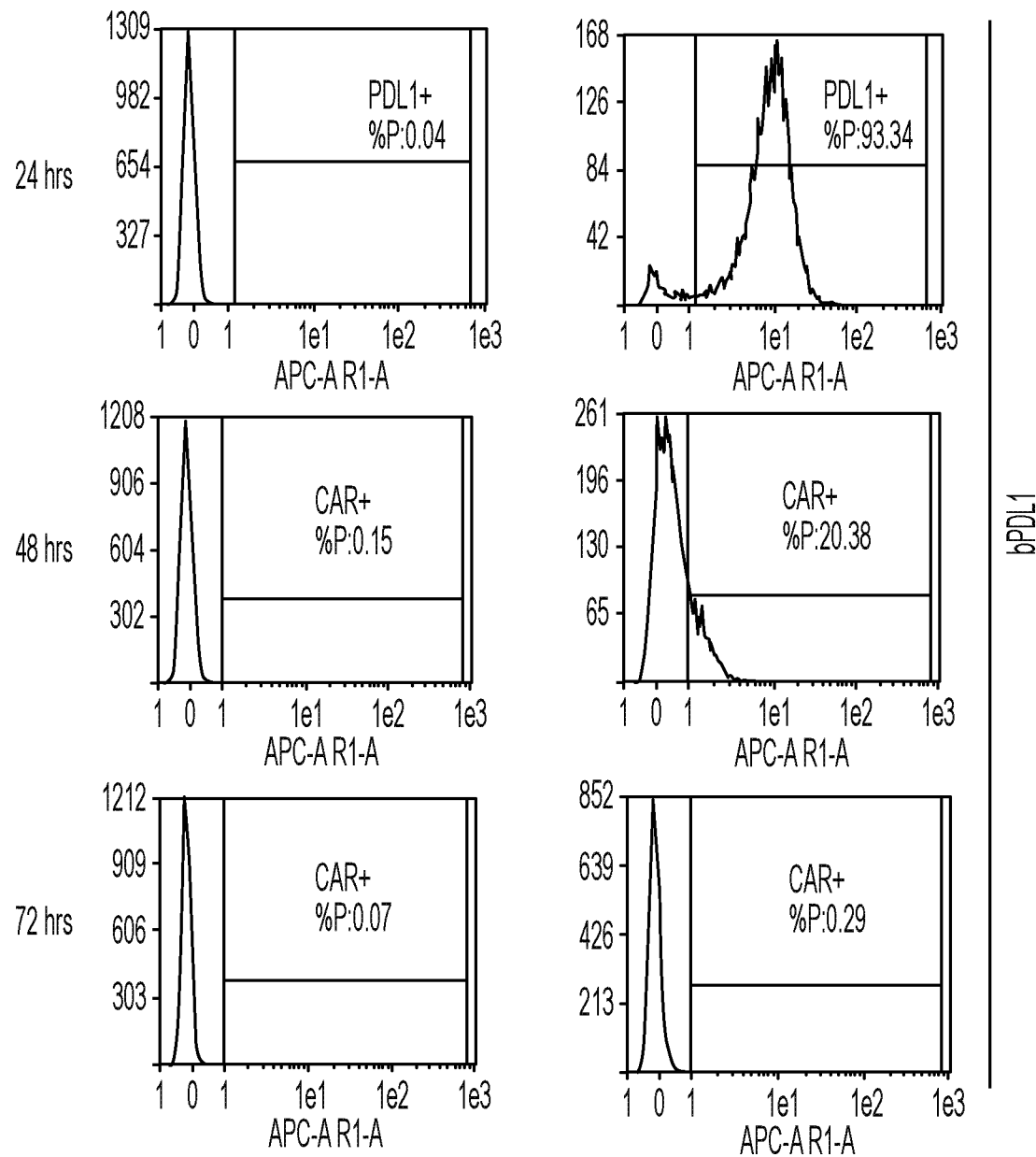
FIG. 2 shows one embodiment of the time course of XL53 PDL1 CAR expression post electroporation.
Figure 3:
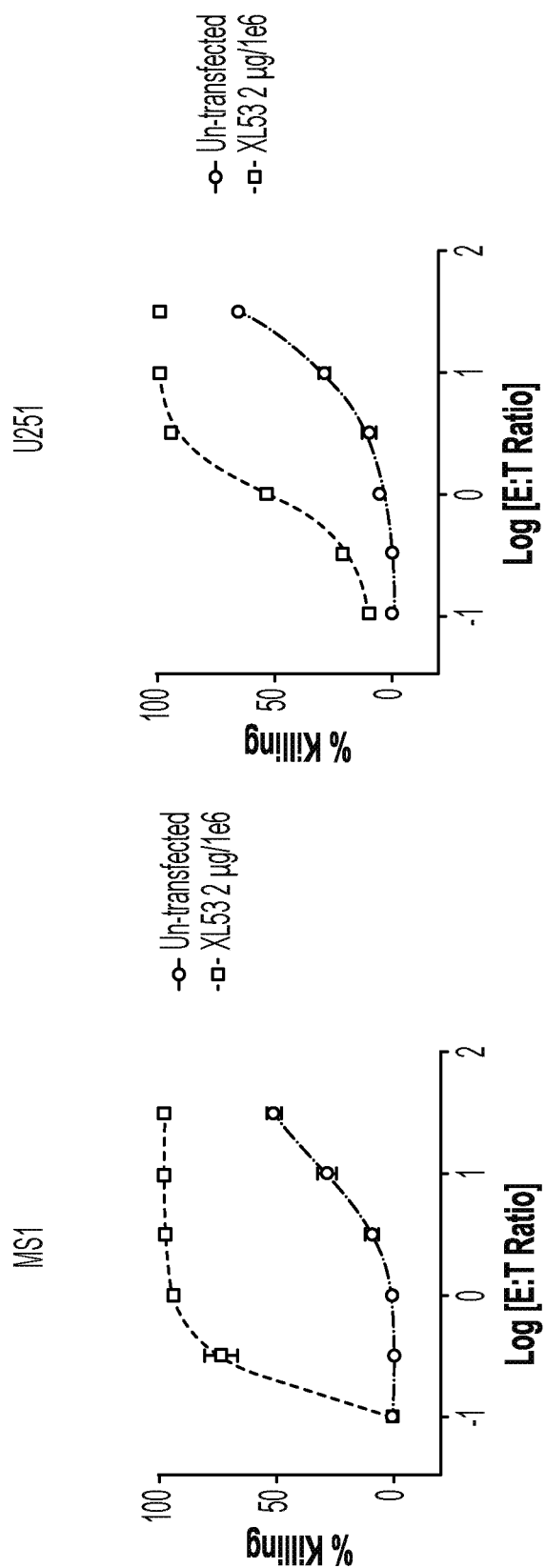
FIG. 3 illustrates one embodiment of the cytotoxic activity on fLuc expressing U251 and MS1 target cells.
Figure 4:
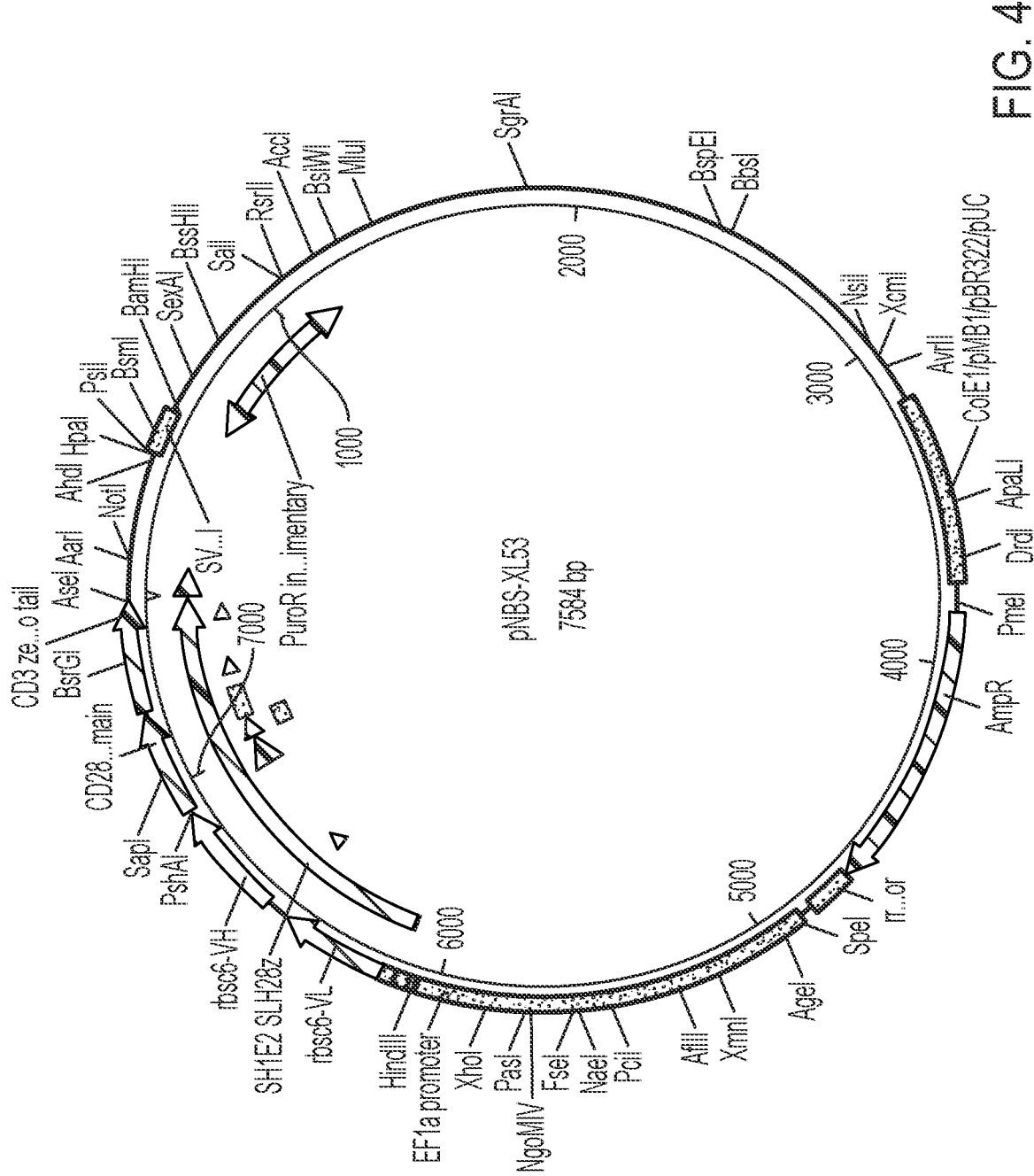
FIG. 4 shows one embodiment of a vector map of the XL53 construct.

FIG. 2 illustrates time course of XL53 PDL1 CAR expression post electroporation, while the cytotoxic activity on fLuc expressing U251 and MS1 target cells are shown in FIG. 3. The cytotoxic assay, as illustrated in FIG. 3, was set up to 2 hours post transfection and after overnight incubation. The vector map of the XL53 construct is shown in FIG. 4. Finally, Table 1 below shows the different sequence portions of the XL53 construct.

TABLE 1

| | pNBS-XL-53(Rbsc6-CD28CD3z-anti-PDL1) |
|---|---|
| Size | 7584 bp |
| 3'UTR *Mus Musculus* hemoglobin alpha | 1-94 |
| polyA | 95-116 |
| SV40 polyA signal | 433-567 |
| Puromycin resistance gene (reverse) | 572-1171 |
| OriP | 3187-3753 |
| Ampicillin resistance gene | 3842-4702 |
| rrnG terminator | 4700-4835 |
| EF1a promoter | 4879-6060 |
| T7 promoter | 6068-6086 |
| 5'UTR | 6087-6192 |
| Kozak sequence | 6123-6130 |
| CD64 signal peptide | 6132-6176 |
| Rbsc6-VL (variable light chain) | 6177-6500 |
| Linker | 6501-6560 |
| Rbsc6-VH (variable heavy chain) | 6561-6914 |
| CD28 hinge region | 6915-7031 |
| CD28 transmembrane domain | 7032-7112 |
| CD28 cytoplasmic domain | 7113-7235 |
| CD3ζ cytoplasmic domain | 7236-7577 |

In another embodiment, the inventors have disclosed the molecule XL53-150A, which comprises the recombinant nucleic acid construct of SEQ ID NO: 2. This molecule is similar to the XL53 molecule except for the following modifications: A 150-polyA stretch is added to the 3' untranslated end of the construct to further stabilize the RNA molecule. Also an internal SapI restriction site is removed from the construct, while the same site is added at the end of the poly A tail. After linearization of the DNA template with SapI, only A nucleotides remain. This further enhances translation of the RNA molecule. The main features of this construct are that it has a longer poly A tail, and it has a more prolonged half-life compared to XL53.

Figure 5:
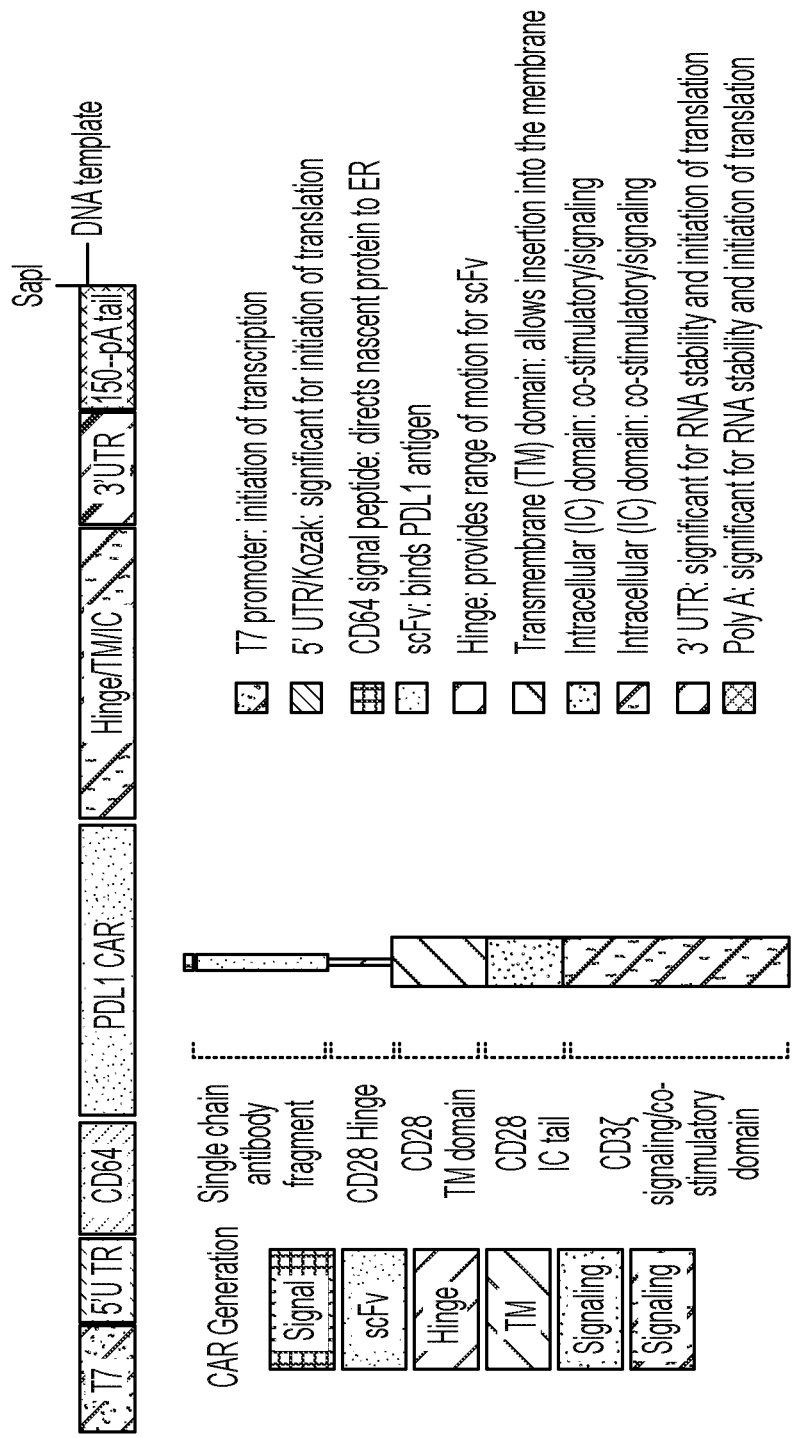
FIG. 5 shows one embodiment of generation of a chimeric antigen targeted at PDL1 protein, pNBS-XL53-150A.

FIG. 5 illustrates generation of a chimeric antigen targeted at PDL1 protein, pNBS-XL53-150A. Similar to the discussion in FIG. 1, the transcription of RNA is initiated by the T7 promoter. The 5'-UTR/Kozak region of nucleotides provides significant for initiation of translation. The nucleic acid sequence encoding the CD64 signal peptide is present in the 3' end of the UTR/Kozak region, and it directs nascent protein to ER. This is followed by scFv region, which binds PDL1 antigen. A hinge region is present next to the scFv region, and that provides a range of motion to the scFv. The hinge region is followed by a transmembrane domain that allows insertion of the nucleotide construct into the membrane. This is followed by one or more intracellular domains comprising co-stimulatory and/or signaling elements. Finally, the 3'-UTR and Poly-A regions are present to provide stability to the RNA as well as initiation of translation. The longer poly-A region in this construct provides for an RNA construct with more stability and longer half-life time.

Figure 6:
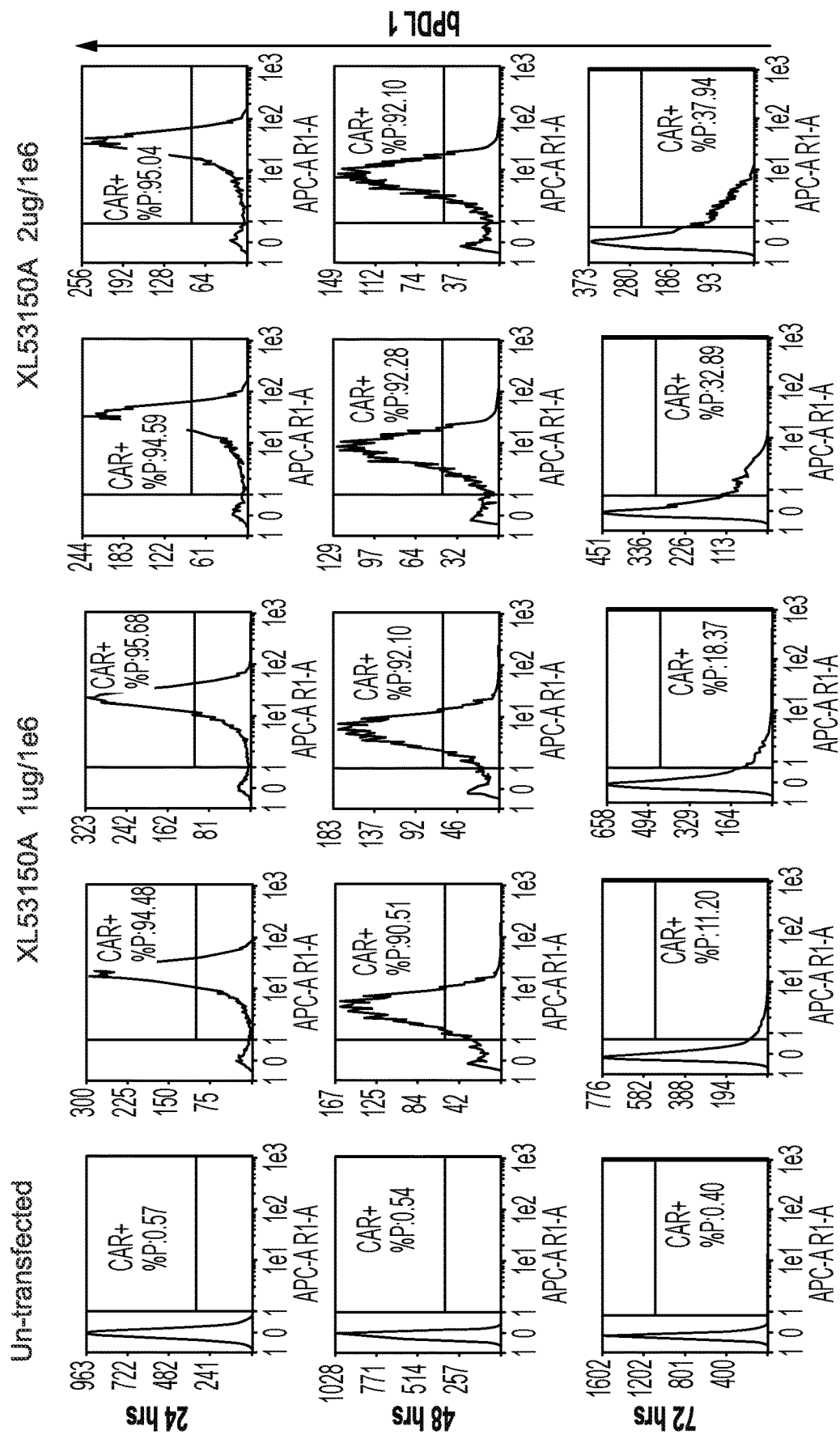
FIG. 6 illustrates one embodiment of a time course of XL53-150A PDL1 CAR expression post electroporation.
Figure 7:
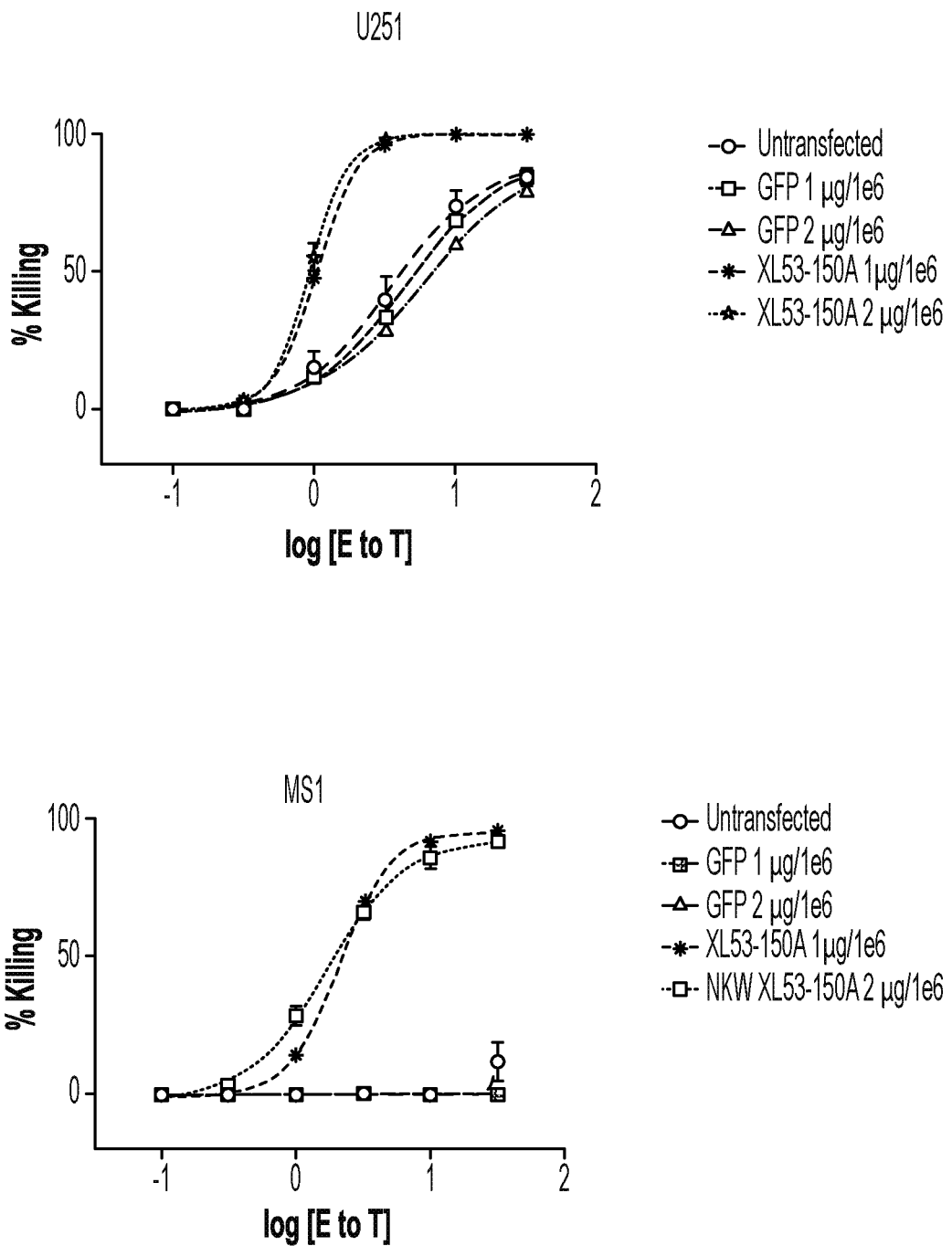
FIG. 7 illustrates one embodiment of cytotoxic activity of NK cells transfected with XL53-150A.
Figure 8:
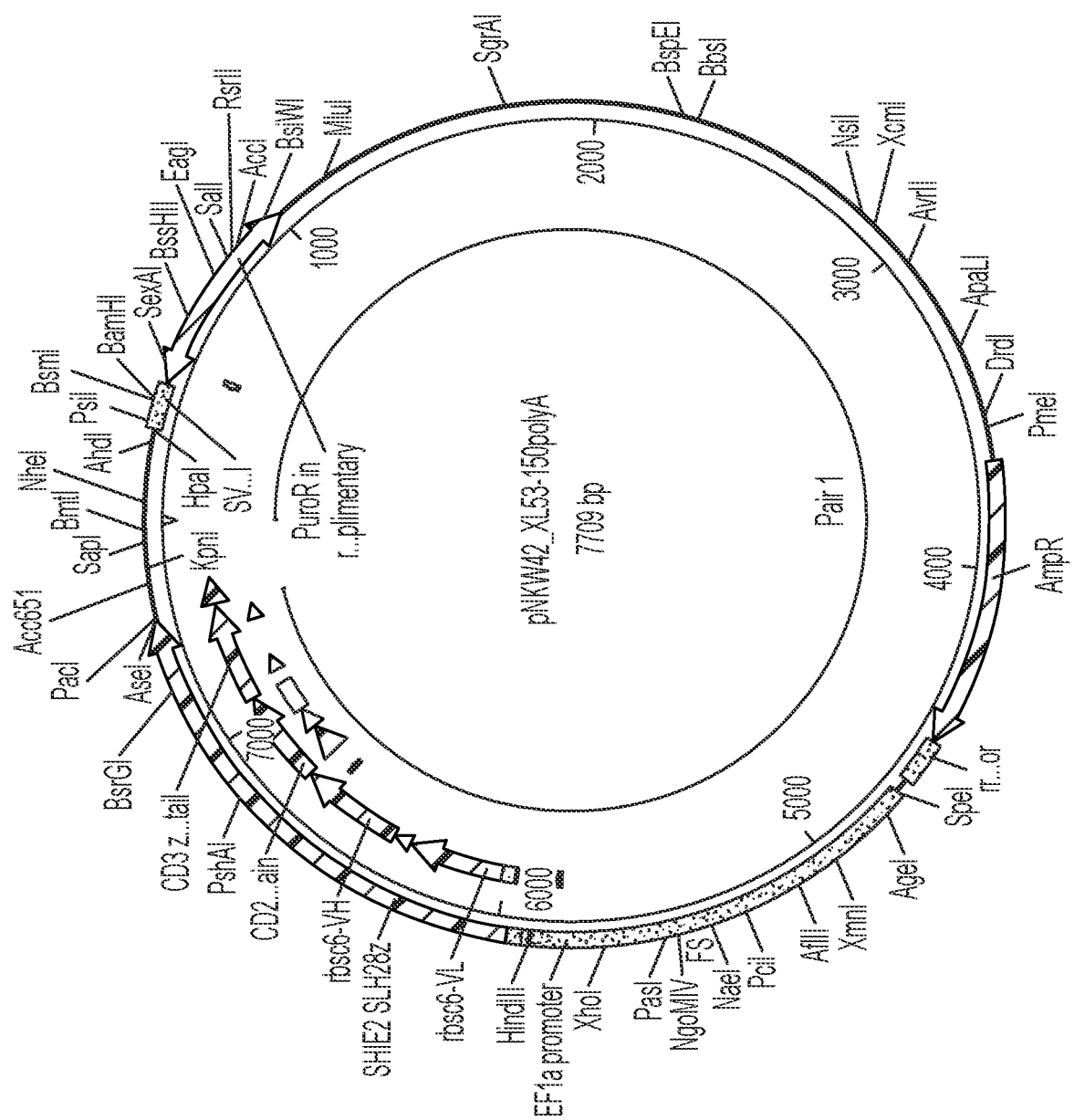
FIG. 8 shows one embodiment of a vector map of the XL53-150A construct.

FIG. 6 illustrates time course of XL53-150A PDL1 CAR expression post electroporation, while the cytotoxic activity of NK cells transfected with XL53-150A are shown in FIG. 7. The vector map of the XL53-150A construct is shown in FIG. 8. Finally, Table 2 below shows the different sequence portions of the XL53-150A construct.

TABLE 2

| Construct name | pNBS-XL-53(Rbsc6-CD28CD3z-anti-PDL1) |
|---|---|
| Size | 7584 bp |
| 3'UTR Mus Musculus hemoglobin alpha polyA | 1-94 |
| | 95-116 |
| SV40 polyA signal | 433-567 |
| Puromycin resistance gene (reverse) | 572-1171 |
| OriP | 3187-3753 |
| Ampicillin resistance gene | 3842-4702 |
| rrnG terminator | 4700-4835 |
| EF1a promoter | 4879-6060 |
| T7 promoter | 6068-6086 |
| 5'UTR | 6087-6192 |
| Kozak sequence | 6123-6130 |
| CD64 signal peptide | 6132-6176 |
| Rbsc6-VL (variable light chain) | 6177-6500 |
| Linker | 6501-6560 |
| Rbsc6-VH (variable heavy chain) | 6561-6914 |
| CD28 hinge region | 6915-7031 |
| CD28 transmembrane domain | 7032-7112 |
| CD28 cytoplasmic domain | 7113-7235 |
| CD3zeta cytoplasmic domain | 7236-7577 |

TABLE 3

| Construct name | NKW29-150A |
|---|---|
| Size | 7493 bp |
| SV40 polyA signal | 271-405 |
| Puromycin resistance gene | 1009-410 |
| Ampicillin resistance gene | 58-918 |
| rrnG terminator | 916-1051 |
| EF1α promoter | 2-1183 |
| T7 promoter | 1191-1209 |
| 5'UTR | 1210-1252 |
| Kozak sequence | 1246-1253 |
| CD64 signal peptide | 1254-1299 |
| Rbsc6-VL (variable light chain) | 1300-1623 |
| Linker | 1624-1683 |
| Rbsc6-VH (variable heavy chain) | 1684-2037 |
| CD28 hinge region | 2038-2154 |
| CD28 transmembrane domain | 2155-2235 |
| CD28 cytoplasmic domain | 2236-2358 |
| FcεRIγ cytoplasmic domain | 2359-2484 |
| 3'UTR *Mus Musculus* hemoglobin alpha polyA | 2492-2585 |
| | 2592-2741 |

In another embodiment, the inventors have disclosed the molecule NKW29, which comprises the recombinant nucleic acid construct of SEQ ID NO: 3. This molecule is very similar to the XL53-150A construct except for the following modification: The CD3ζ intracellular domain of the XL53-150A is replaced with the intracellular domain of FcεRIγ. The main features of this construct are (i) It uses a combination of intracellular domains of CD28 and FcεRIγ for enhanced cytotoxic activity against target cells; and (ii) it is relatively stable due to the long poly A tail.

Figure 9:
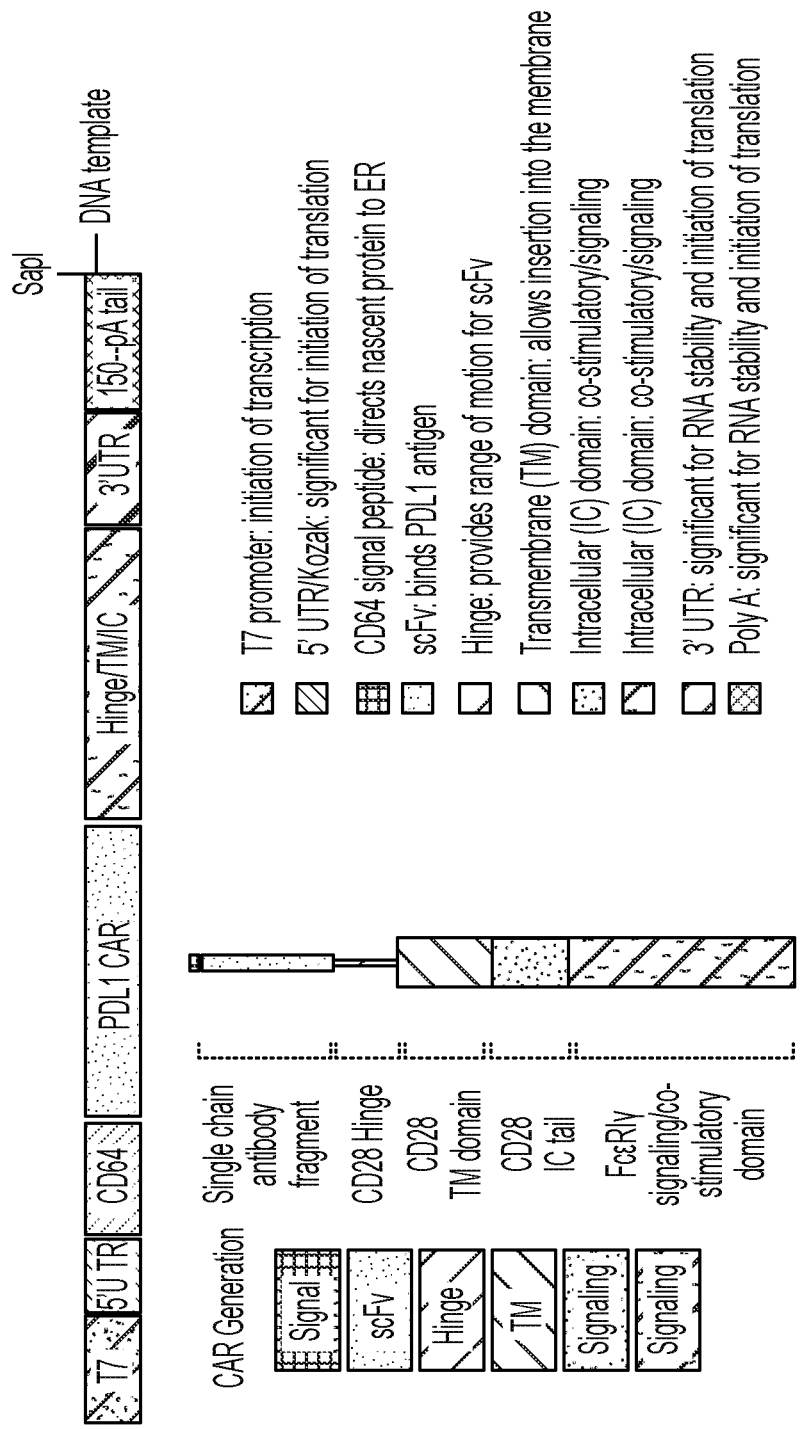
FIG. 9 shows one embodiment of generation of a chimeric antigen targeted at PDL1 protein, NKW29-150A.

FIG. 9 illustrates generation of a chimeric antigen targeted at PDL1 protein, NKW29-150A. Similar to the discussion in FIGS. 1 and 5, the transcription of RNA is initiated by the T7 promoter. The 5'-UTR/Kozak region of nucleotides provides significant for initiation of translation. The nucleic acid sequence encoding the CD64 signal peptide is present in the 3' end of the UTR/Kozak region, and it directs nascent protein to ER. This is followed by scFv region, which binds PDL1 antigen. A hinge region is present next to the scFv region, and that provides a range of motion to the scFv. The hinge region is followed by a transmembrane domain that allows insertion of the nucleotide construct into the membrane. This is followed by one or more intracellular domains comprising co-stimulatory and/or signaling elements. The intracellular domain illustrated in FIG. 9 and SEQ ID NO: 3 is intracellular domain of FcεRIγ. Finally, the 3'-UTR and Poly-A regions are present to provide stability to the RNA as well as initiation of translation. The longer poly-A region in this construct provides for an RNA construct with more stability and longer half-life time.

Figure 10:
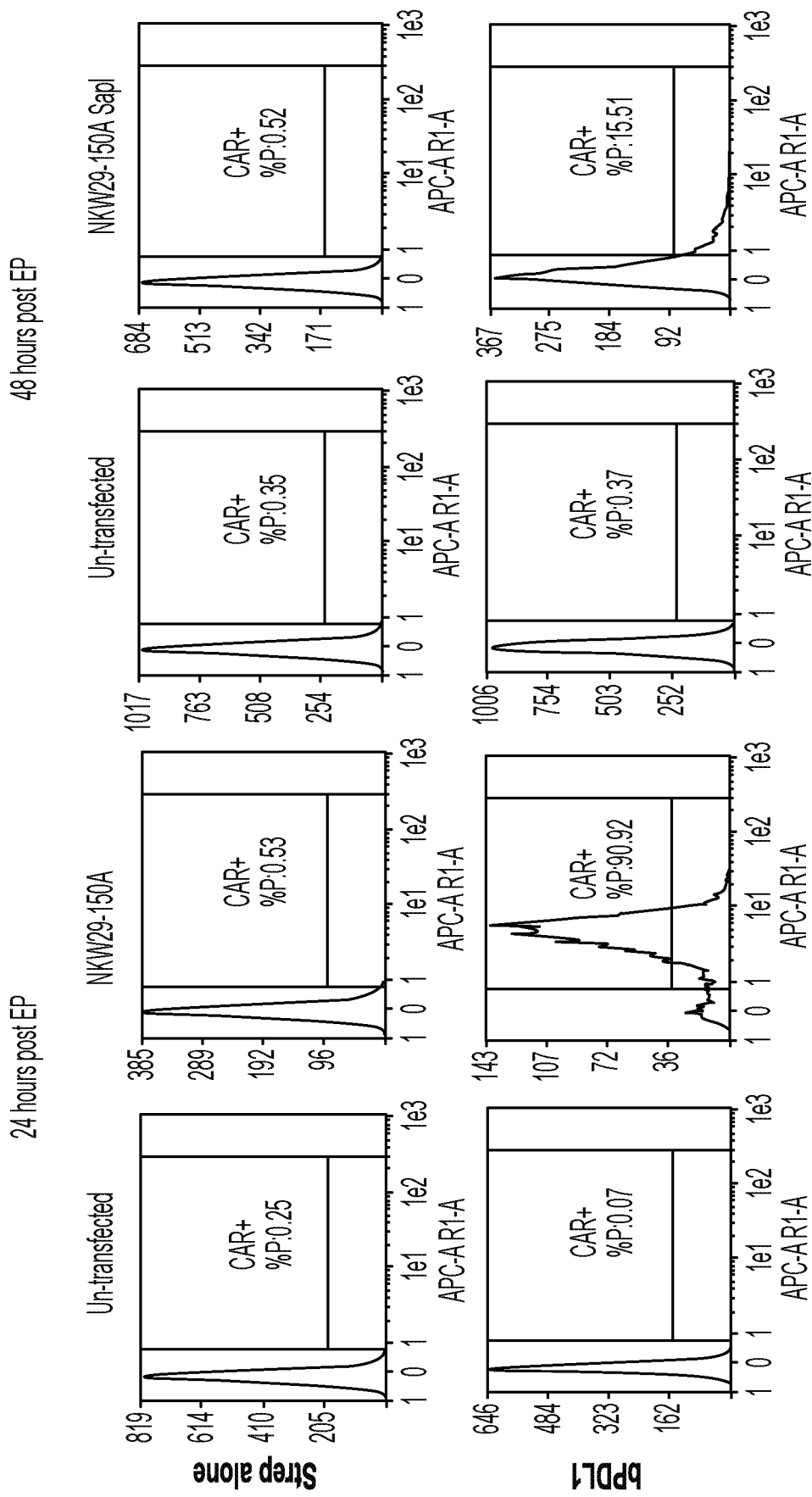
FIG. 10 depicts one embodiment of time course of NKW29-150A PDL1 CAR expression in NK cells.

FIG. 10 illustrates time course of NKW29-150A PDL1 CAR expression in NK cells, 24 and 48 hours post electroporation. In vitro transcription was done using SapI digested NKW29-150A DNA. NK cells were transfected with the in-vitro transcribed RNA (2 ug/1e6 cells). PDL1 expression was determined using flow cytometry and biotinylated PDL1/streptavidin APC.

Figure 11:
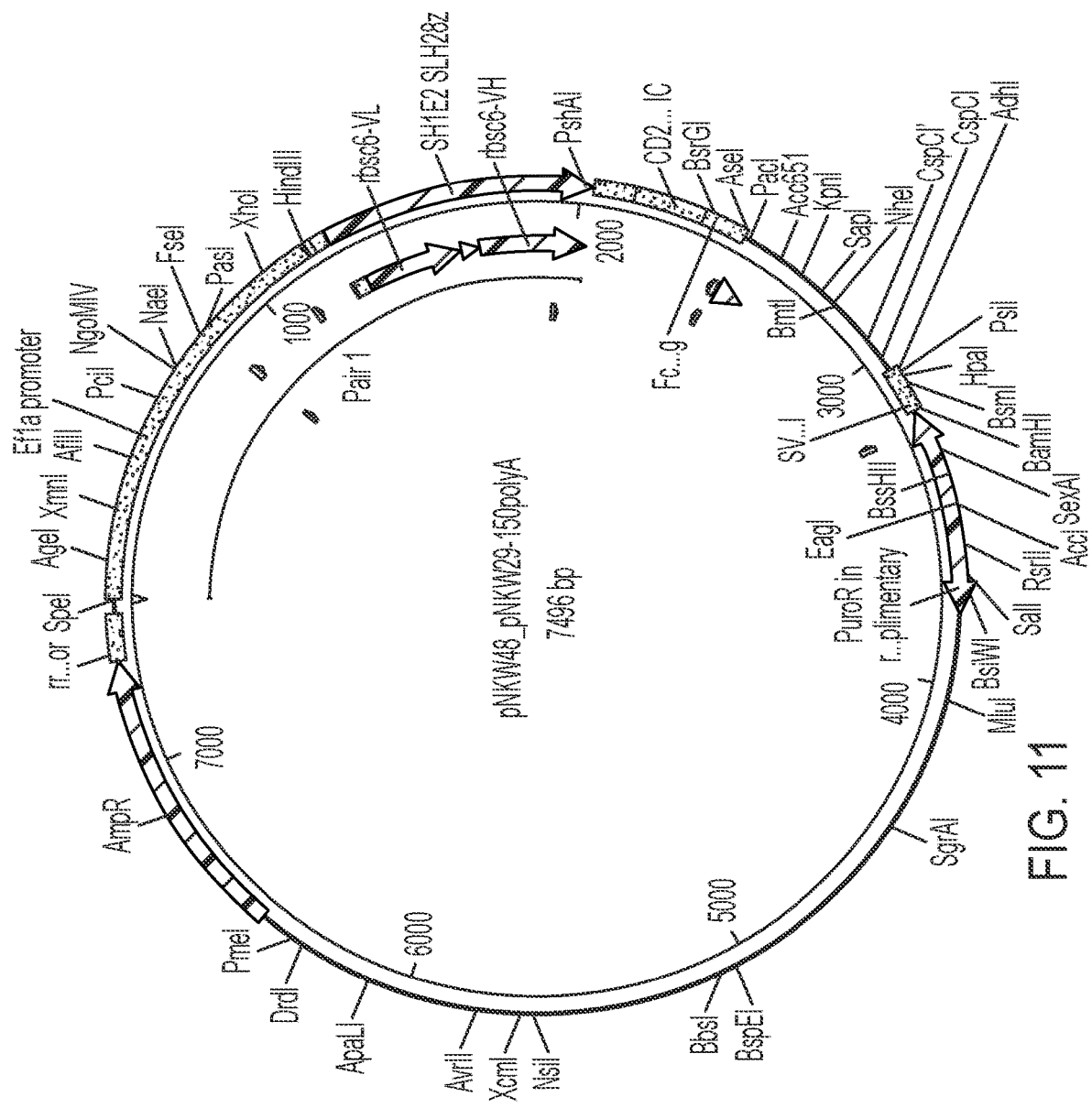
FIG. 11 illustrates one embodiment of a vector map of the NKW29-150A construct.

The vector map of the NKW29-150A construct is shown in FIG. 11. Finally, Table 3 below shows the different sequence portions of the NKW29-150A construct.

In another embodiment, the inventors have disclosed the XL53-Tri-cistronic molecule, which comprises the recombinant nucleic acid construct of SEQ ID NO: 4. This molecule is similar to XL53 except for it co-expresses 3 genes: PDL1 CAR, CD16a and ER-retained 112. A P2A sequence and an EMCV IRES precede the CD16a and ER-IL2 genes respectively, allow independent translation of these genes. The main features of this construct are: (a) It expresses CD16a that engages in ADCC (antibody dependent cellular toxicity) and further triggers NK cell lysis of the target cells; and (b) It expresses IL-2, a cytokine that is a crucial growth factor for growth and cytotoxic activity of NK cells.

Figure 12:
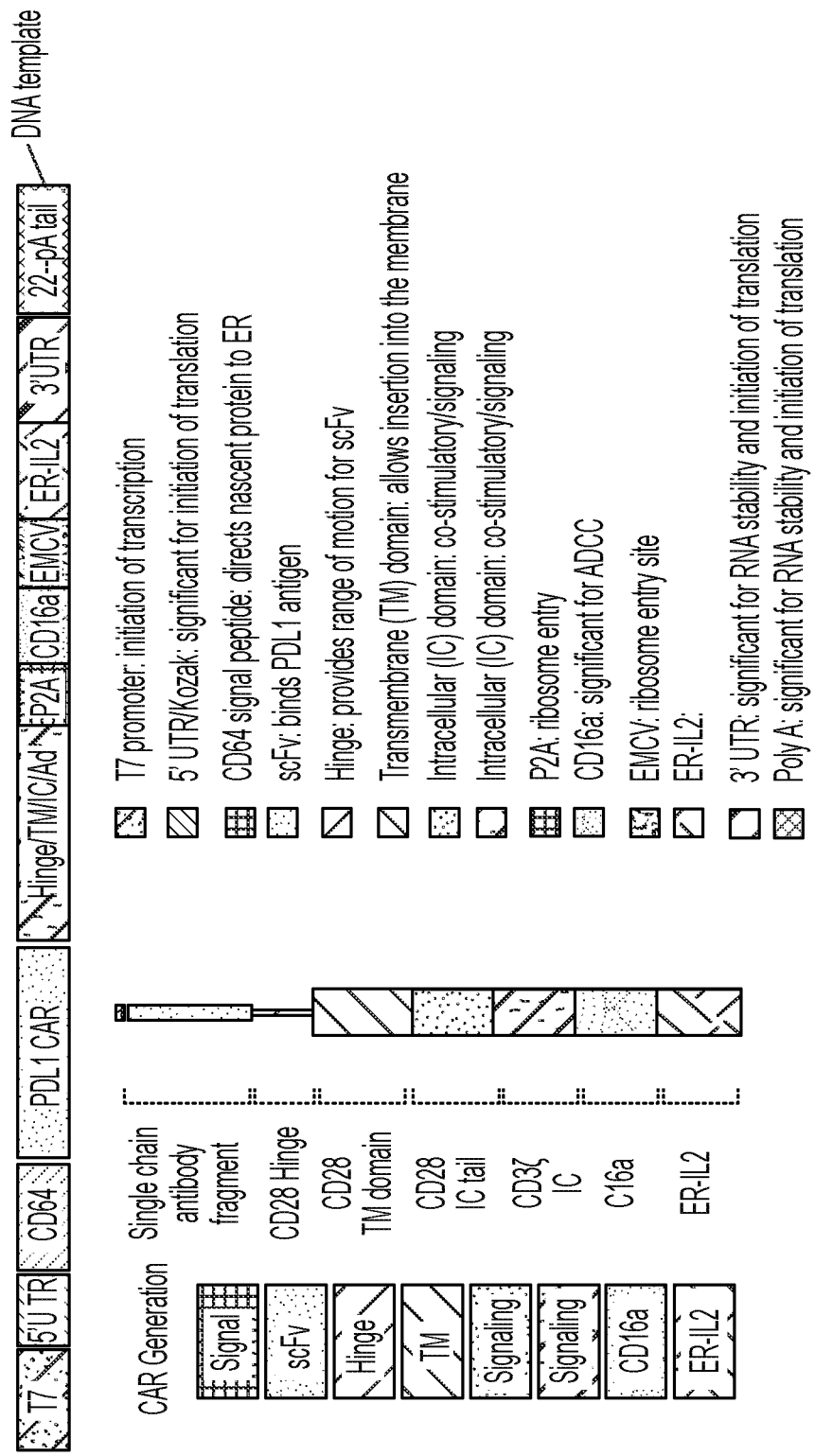
FIG. 12 illustrates one embodiment of generation of a chimeric antigen targeted at PDL1 protein, tricistronic XL35.

FIG. 12 illustrates generation of a chimeric antigen targeted at PDL1 protein, tricistronic XL53. Similar to the discussion in FIG. 1, the transcription of RNA is initiated by the T7 promoter. The 5'-UTR/Kozak region of nucleotides provides significant for initiation of translation. The nucleic acid sequence encoding the CD64 signal peptide is present in the 3' end of the UTR/Kozak region, and it directs nascent protein to ER. This is followed by scFv region, which binds PDL1 antigen. A hinge region is present next to the scFv region, and that provides a range of motion to the scFv. The hinge region is followed by a transmembrane domain that allows insertion of the nucleotide construct into the membrane. This is followed by one or more intracellular domains comprising co-stimulatory and/or signaling elements. The co-stimulatory and/or signaling elements are followed by P2A for ribosome entry, CD16a which is significant for ADCC, EMCV which is the ribosome entry site, and ER-IL2. Finally, the 3'-UTR and Poly-A regions are present to provide stability to the RNA as well as initiation of translation. The longer poly-A region in this construct provides for an RNA construct with more stability and longer half-life time.

Figure 13:
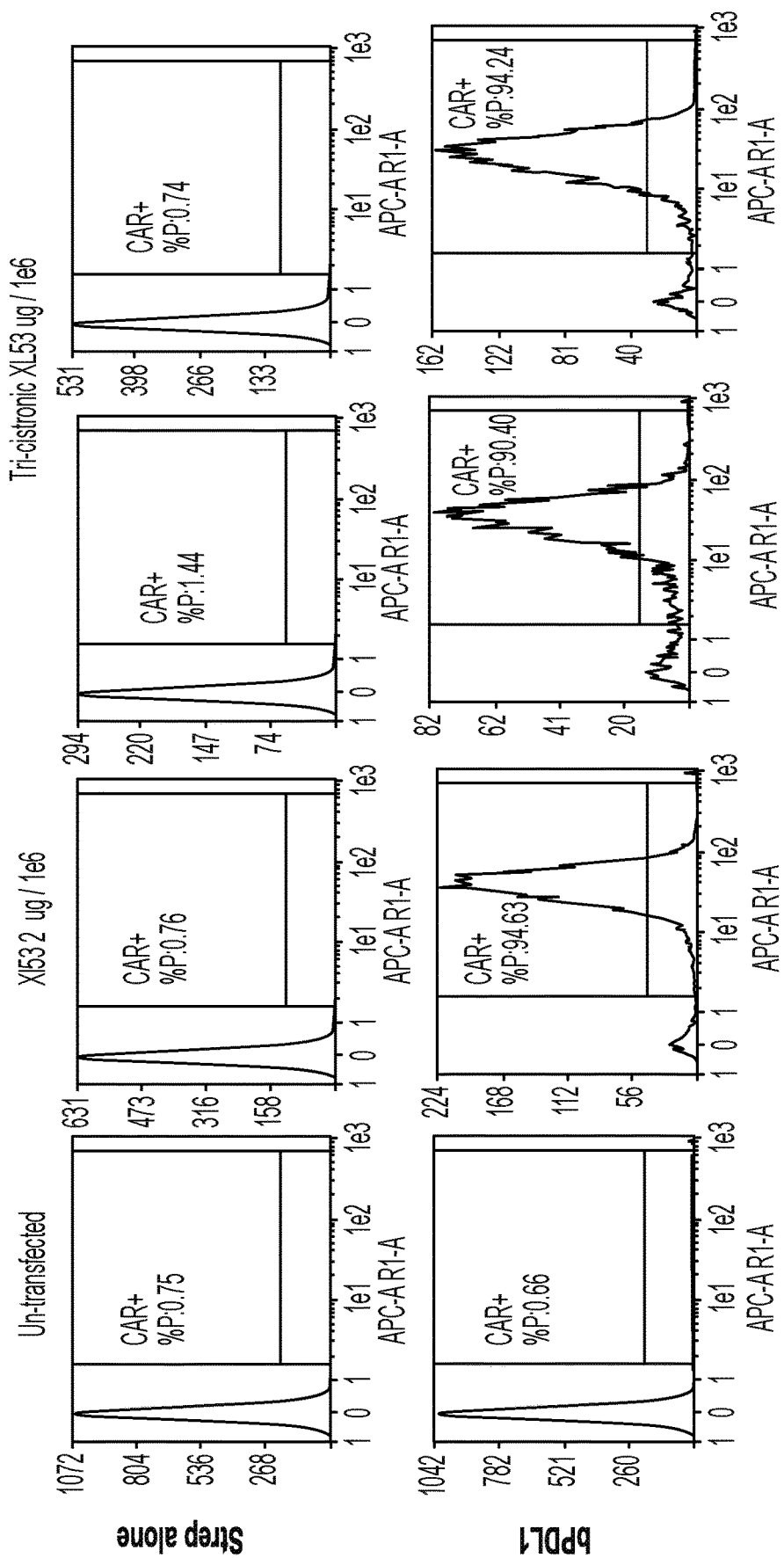
FIG. 13 illustrates one embodiment of XL53-tricistronic PDL1 CAR expression 24 hours post electroporation.
Figure 14:
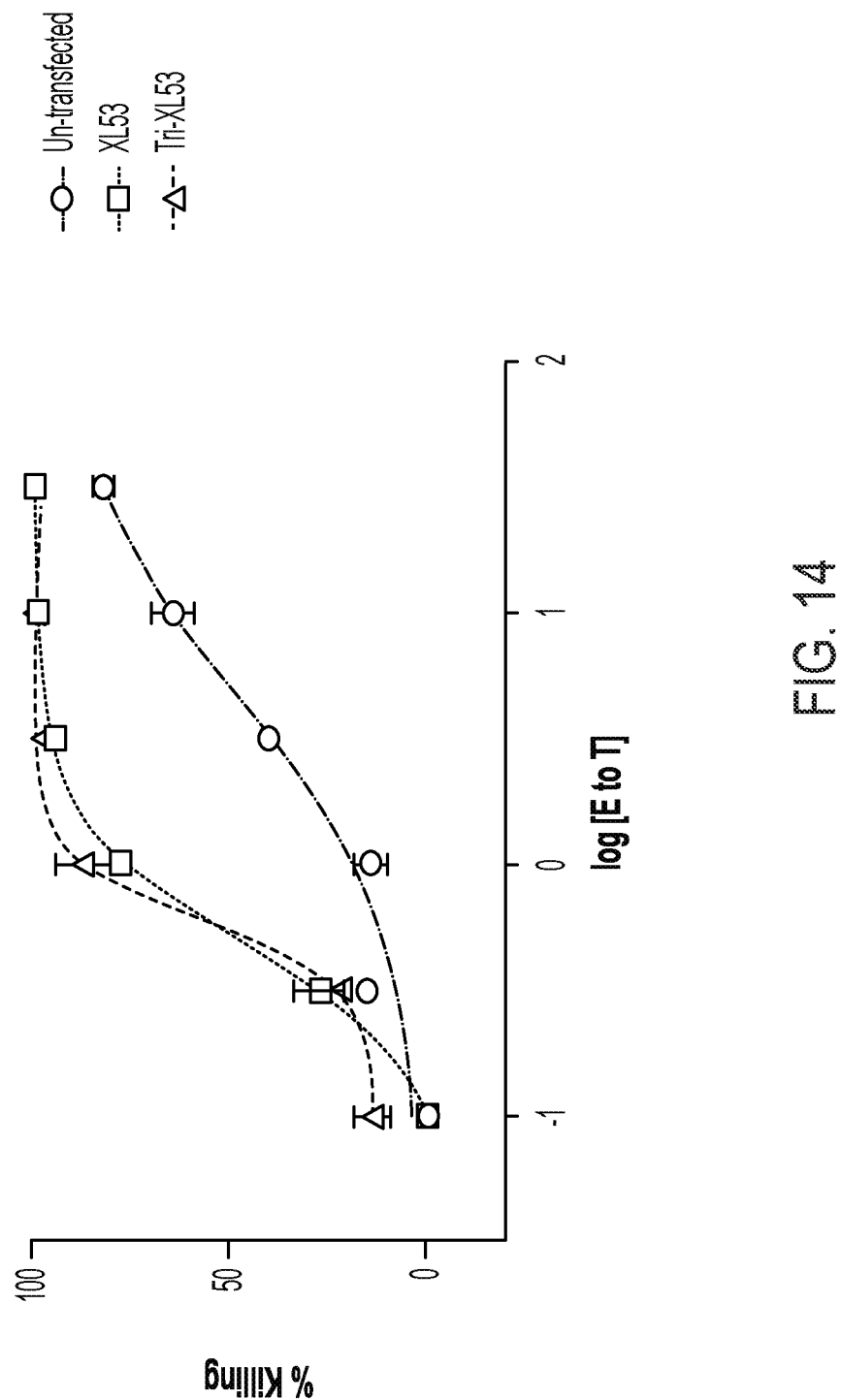
FIG. 14 depicts one embodiment of cytotoxic activity of CAR-infected cells on MS1 fLuc target cells.
Figure 15:
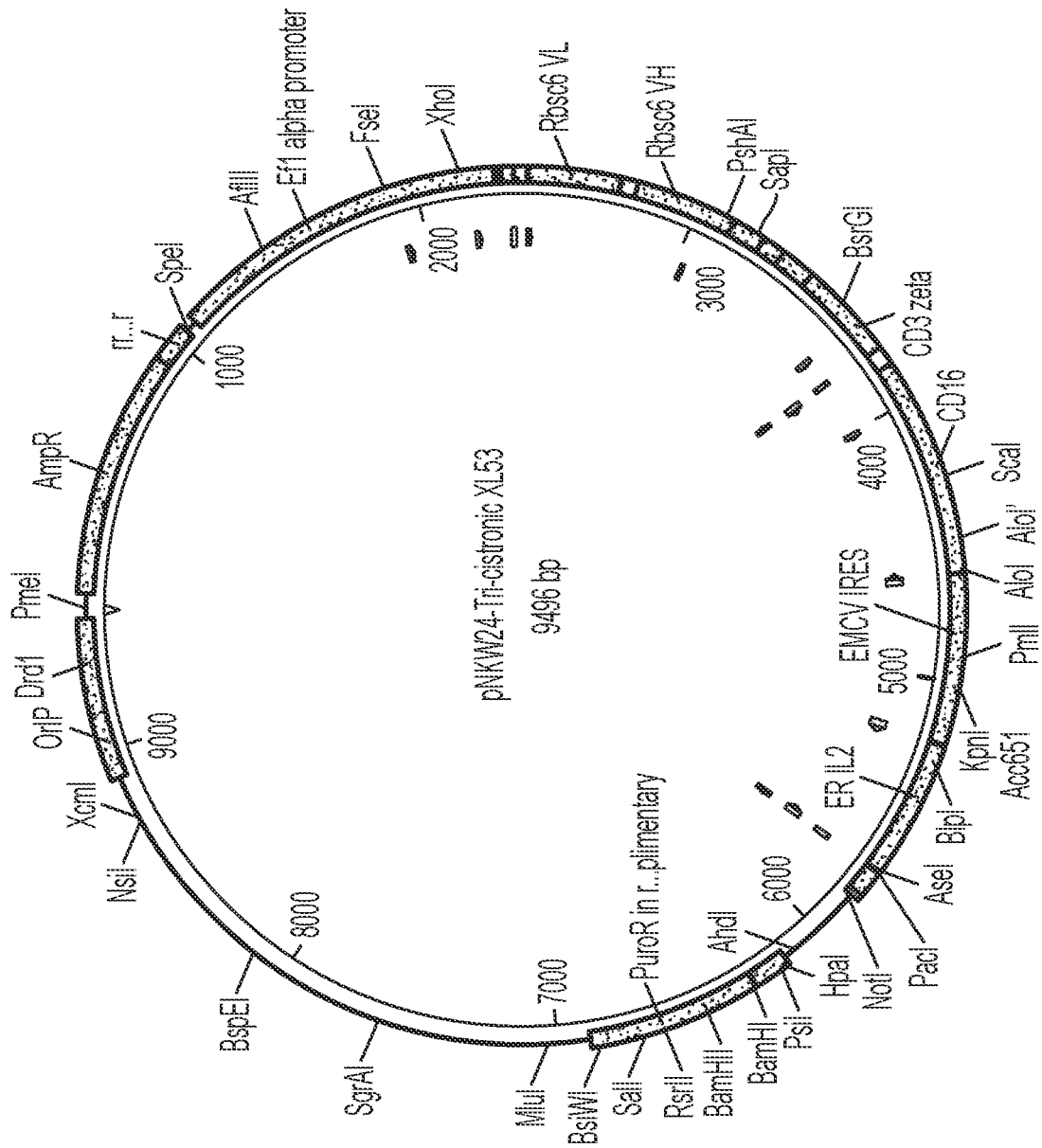
FIG. 15 illustrates one embodiment of vector map of the XL53-tricistronic construct.

FIG. 13 illustrates XL53-tricistronic PDL1 CAR expression 24 hours post electroporation. The cytotoxic activity of CAR-infected cells on MS1 fLuc target cells are shown in FIG. 14. In this case, the transfected cells were mixed with target cells 2 hours post electroporation for overnight incubation. The vector map of the XL53-tricistronic construct is shown in FIG. 15. Finally, Table 4 below shows the different sequence portions of the XL53-tricistronic construct.

TABLE 4

| I. Construct name | XL-53 Tricistronic |
|---|---|
| Size | 9496 bp |
| Ampicillin resistance gene | 58-918 |
| rrnG terminator | 916-1051 |
| EF1a promoter | 1095-2276 |
| T7 promoter | 2284-2302 |
| 5'UTR | 2303-2345 |
| Kozak sequence | 2339-2346 |
| CD64 signal peptide | 2348-2392 |
| Rbsc6-VL (variable light chain) | 2393-2716 |
| Linker/spacer | 2717-2776 |
| Rbsc6-VH (variable heavy chain) | 2777-3130 |
| CD28 hinge region | 3131-3247 |
| CD28 transmembrane domain | 3248-3328 |
| CD28 cytoplasmic domain | 3329-3451 |
| CD3zeta cytoplasmic tail | 3452-3790 |
| P2A | 3791-3856 |
| FcγRIIIa (CD 16a) | 3857-4621 |
| EMCV IRES | 4622-5218 |
| ER IL2 | 5223-5705 |
| 3'UTR *Mus Musculus* hemoglobin alpha | 5713-5806 |
| polyA | 5807-5828 |
| SV40 polyA signal | 6145-6279 |
| Puromycin resistant gene | 6284-6883 |
| OriP | 8899-9465 |

Most currently available CAR technology uses viral vectors as a way of delivery of a DNA molecule to the cells. The viral DNA enters the nucleus and can integrate into the host genome. The inventors have developed a new approach that uses an RNA molecule because RNA only enters the cytoplasm and is ready to be translated. The inventors have overcome the degradation of RNA molecule problem by introducing several elements such as 5' and 3' UTR as well as a long poly-A to improve stability of the molecules disclosed herein.

Some variations to the inventive concept as contemplated by the inventors would be introduction of different 5' or 3' UTR elements that can improve stability of the RNA molecule. The construct can also be altered by addition (or swapping) of more co-stimulatory domains. Addition of other cytokine genes to the same construct (as a bi- or tri-cistronic) can also improve activity of the molecule.

In one embodiment, disclosed herein is a recombinant nucleic acid, comprising: a T7 promoter sequence portion, a 5' untranslated (5'-UTR) sequence portion, a signal peptide sequence portion, a single chain antibody fragment sequence portion, a hinge region sequence portion, a transmembrane domain sequence portion, and one or more intracellular domain sequence portions. The signal peptide sequence portion further comprises a sequence encoding CD64. The RNA formed from the recombinant DNA nucleic acid is stabilized by a 5'-UTR sequence portion and/or a Kozak sequence. The Kozak sequence (or Kozak consensus sequence) is a nucleic acid motif that functions as the translation initiation site in most mRNA transcripts. It is regarded as the optimum sequence for initiating translation in eukaryotes, the sequence is an integral aspect of protein regulation. The sequence is generally defined as 5'-(gcc)gccRccAUGG-3' where R indicates a purine (adenine or guanine). Of course, variations of the Kozak sequences are known to skilled artisans and contemplated herein by the inventors.

The single chain antibody fragment sequence portion of the recombinant nucleic acid comprises a sequence encoding for a single chain variable fragment that is adapted to bind PDL1 antigen. The hinge portion plays the role of providing range of motion for the single chain antibody fragment sequence portion. The transmembrane domain sequence portion enables insertion of the recombinant nucleic acid to a membrane. The intracellular domain sequence portion comprises co-stimulatory or signaling sequence portions such as CD28, CD3ζ, and/or FcεRIγ. The intracellular domain sequence portions are selected to provide enhanced cytotoxic activity against tumor cells. The 3'-UTR region towards the 3' end of the recombinant nucleic acid provides stability to the RNA and initiation of translation. Furthermore, a poly-A sequence portion may be present for additional stability reason. In some embodiments, the poly-A sequence portion comprises at least 150 adenine nucleotides. In some embodiments, the recombinant nucleic acid may be tri-cistronic—in other words, the nucleic acid may have sequence encoding for PDL1-CAR, CD16a, and ER-IL2.

In another aspect of the instant disclosure, provided herein are modified NK cells comprising one or more nucleic acids encoding: a T7 promoter sequence portion, a 5' untranslated (5'-UTR) sequence portion, a signal peptide sequence portion, a single chain antibody fragment sequence portion, a hinge region sequence portion, a transmembrane domain sequence portion, and one or more intracellular domain sequence portions; wherein the nucleic acid sequences are operably linked to each other as a single polynucleotide.

Natural killer (NK) cells are cells of the immune system that kill target cells in the absence of a specific antigenic stimulus, and without restriction according to major histocompatibility complex (MHC) class. NK cells are characterized by the presence of CD56 and the absence of CD3 surface markers. Endogenous NK cells are generally heterogeneous populations of cells within which NK cells have been enriched. Endogenous NK cells may be intended for autologous or allogeneic treatment of a patient.

As used herein, "immunotherapy" refers to the use of NK cells modified or unmodified, naturally occurring or modified NK cell or T-cell, whether alone or in combination, and which are capable of inducing cytotoxicity when contacting a target cell.

Treatment of Cancer

Provided herein are methods of treating a cancer or a tumor in a subject, the method comprising administering to the subject a therapeutically effective amount of the modified NK cells as disclosed above or a composition comprising modified NK cells as disclosed above to a patient in need thereof. The administration is contemplated to treat the cancer, reduces the size of the tumor in the subject, or reduce cancer metastasis in the subject.

The term "cancer" refers to all types of cancer, neoplasm, or malignant tumors found in mammals, including leukemia, carcinomas and sarcomas. Exemplary cancers include cancer of the brain, breast, cervix, colon, head & neck, liver, kidney, lung, non-small cell lung, melanoma, mesothelioma, ovary, sarcoma, stomach, uterus and Medulloblastoma. Additional examples include, Hodgkin's Disease, Non-Hodgkin's Lymphoma, multiple myeloma, neuroblastoma, ovarian cancer, rhabdomyosarcoma, primary thrombocytosis, primary macroglobulinemia, primary brain tumors, cancer, malignant pancreatic insulanoma, malignant carcinoid, urinary bladder cancer, premalignant skin lesions, testicular cancer, lymphomas, thyroid cancer, neuroblastoma, esophageal cancer, genitourinary tract cancer, malignant hypercalcemia, endometrial cancer, adrenal cortical cancer, neoplasms of the endocrine and exocrine pancreas, and prostate cancer.

The terms "metastasis," "metastatic," and "metastatic cancer" can be used interchangeably and refer to the spread of a proliferative disease or disorder, e.g., cancer, from one organ or another non-adjacent organ or body part. Cancer occurs at an originating site, e.g., breast, which site is referred to as a primary tumor, e.g., primary breast cancer. Some cancer cells in the primary tumor or originating site acquire the ability to penetrate and infiltrate surrounding normal tissue in the local area and/or the ability to penetrate the walls of the lymphatic system or vascular system circulating through the system to other sites and tissues in the body. A second clinically detectable tumor formed from cancer cells of a primary tumor is referred to as a metastatic or secondary tumor. When cancer cells metastasize, the metastatic tumor and its cells are presumed to be similar to those of the original tumor. Thus, if lung cancer metastasizes to the breast, the secondary tumor at the site of the breast consists of abnormal lung cells and not abnormal breast cells. The secondary tumor in the breast is referred to a metastatic lung cancer. Thus, the phrase metastatic cancer refers to a disease in which a subject has or had a primary tumor and has one or more secondary tumors. The phrases non-metastatic cancer or subjects with cancer that is not metastatic refers to diseases in which subjects have a primary tumor but not one or more secondary tumors. For example, metastatic lung cancer refers to a disease in a subject with or with a history of a primary lung tumor and with one or more secondary tumors at a second location or multiple locations, e.g., in the breast.

As used herein, "treating" or "treatment of" a condition, disease or disorder or symptoms associated with a condition, disease or disorder refers to an approach for obtaining beneficial or desired results, including clinical results. Beneficial or desired clinical results can include, but are not limited to, alleviation or amelioration of one or more symptoms or conditions, diminishment of extent of condition, disorder or disease, stabilization of the state of condition, disorder or disease, prevention of development of condition, disorder or disease, prevention of spread of condition, disorder or disease, delay or slowing of condition, disorder or disease progression, delay or slowing of condition, disorder or disease onset, amelioration or palliation of the condition, disorder or disease state, and remission, whether partial or total. "Treating" can also mean prolonging survival of a subject beyond that expected in the absence of treatment. "Treating" can also mean inhibiting the progression of the condition, disorder or disease, slowing the progression of the condition, disorder or disease temporarily, although in some instances, it involves halting the progression of the condition, disorder or disease permanently. As used herein the terms treatment, treat, or treating refers to a method of reducing the effects of one or more symptoms of a disease or condition characterized by expression of the protease or symptom of the disease or condition characterized by expression of the protease. Thus in the disclosed method, treatment can refer to a 10%, 20%, 30%, 40%, 50%, 60%, 70%, 80%, 90%, or 100% reduction in the severity of an established disease, condition, or symptom of the disease or condition. For example, a method for treating a disease is considered to be a treatment if there is a 10% reduction in one or more symptoms of the disease in a subject as compared to a control. Thus the reduction can be a 10%, 20%, 30%, 40%, 50%, 60%, 70%, 80%, 90%, 100%, or any percent reduction in between 10% and 100% as compared to native or control levels. It is understood that treatment does not necessarily refer to a cure or complete ablation of the disease, condition, or symptoms of the disease or condition.

Further, as used herein, references to decreasing, reducing, or inhibiting include a change of 10%, 20%, 30%, 40%, 50%, 60%, 70%, 80%, 90% or greater as compared to a control level and such terms can include but do not necessarily include complete elimination.

The terms subject, patient, individual, etc. are not intended to be limiting and can be generally interchanged. That is, an individual described as a patient does not necessarily have a given disease, but may be merely seeking medical advice. As used throughout, a subject can be a vertebrate, more specifically a mammal (e.g., a human, horse, cat, dog, cow, pig, sheep, goat, mouse, rabbit, rat, and guinea pig), birds, reptiles, amphibians, fish, and any other animal. The term does not denote a particular age or sex. Thus, adult and newborn subjects, whether male or female, are intended to be covered. As used herein, patient, individual and subject may be used interchangeably and these terms are not intended to be limiting. That is, an individual described as a patient does not necessarily have a given disease, but may be merely seeking medical advice. The terms patient or subject include human and veterinary subjects.

"Administration" or "administering," as used herein, refers to providing, contacting, and/or delivering a compound or compounds by any appropriate route to achieve the desired effect. Administration may include, but is not limited to, oral, sublingual, parenteral (e.g., intravenous, subcutaneous, intracutaneous, intramuscular, intraarticular, intraarterial, intrasynovial, intrasternal, intrathecal, intralesional or intracranial injection), transdermal, topical, buccal, rectal, vaginal, nasal, ophthalmic, via inhalation, and implants. Optionally, the NK cells are administered parenterally. Optionally, the NK cells are administered intravenously. Optionally, the NK cells are administered peritumorally.

The modified NK cells as disclosed herein can be administered to a subject by absolute numbers of cells, e.g., said subject can be administered from about 1000 cells/injection to up to about 10 billion cells/injection, such as at about, at least about, or at most about, $1\times10^{10}$, $1\times10^9$, $1\times10^8$, $1\times10^7$, $5\times10^7$, $1\times10^6$, $5\times10^6$, $1\times10^5$, $5\times10^5$, $1\times10^4$, $5\times10^4$, $1\times10^3$, $5\times10^3$ (and so forth) NK cells per injection, or any ranges between any two of the numbers, end points inclusive. Optionally, from $1\times10^8$ to $1\times10^{10}$ cells are administered to the subject. Optionally, the cells are administered one or more times weekly for one or more weeks. Optionally, the cells are administered once or twice weekly for 1, 2, 3, 4, 5, 6, 7, 8, 9, 10 or more weeks.

In another embodiment, the total dose may also calculated by $m^2$ of body surface area. The subject may be administered from about 1000 cells/injection/$m^2$ to up to about 10 billion cells/injection/$m^2$, such as at about, at least about, or at most about, $1\times10^{10}/m^2$, $1\times10^9/m^2$, $1\times10^8/m^2$, $1\times10^7/m^2$, $5\times10^7/m^2$, $1\times10^6/m^2$, $5\times10^6/m^2$, $1\times10^5/m^2$, $5\times10^5/m^2$, $1\times10^4/m^2$, $5\times10^4/m^2$, $1\times10^3/m^2$, $5\times10^3/m^2$ (and so forth) NK cells per injection, or any ranges between any two of the numbers, end points inclusive. Optionally, from $1\times10^3$ to $1\times10^{10}$, per m2 of the NK cells are administered to the subject. Optionally, $2\times10^9$ per $m^2$, of the NK cells are administered to the subject.

Optionally, NK cells can be administered to such individual by relative numbers of cells, e.g., said individual can be administered about 1000 cells to up to about 10 billion cells per kilogram of the individual, such as at about, at least about, or at most about, $1\times10^{10}$, $1\times10^9$, $1\times10^8$, $1\times10^7$, $5\times10^7$, $1\times10^6$, $5\times10^6$, $1\times10^5$, $5\times10^5$, $1\times10^4$, $5\times10^4$, $1\times10^3$, 5×10³ (and so forth) NK® cells per kilogram of the individual, or any ranges between any two of the numbers, end points inclusive.

In some embodiments, NK cells are administered in a composition comprising NK cells and a medium, such as human serum or an equivalent thereof. The medium may comprise human serum albumin and/or human plasma. Optionally, the medium comprises about 1% to about 15% human serum or human serum equivalent. Optionally, the medium comprises about 1% to about 10% human serum or human serum equivalent. Optionally, the medium comprises about 1% to about 5% human serum or human serum equivalent. Optionally, the medium comprises about 2.5% human serum or human serum equivalent. Optionally, the serum is human AB serum. Optionally, a serum substitute that is acceptable for use in human therapeutics is used instead of human serum. Such serum substitutes may be known in the art. Optionally, NK cells are administered in a composition comprising NK cells and an isotonic liquid solution that supports cell viability. Optionally, NK cells are administered in a composition that has been reconstituted from a cryopreserved sample.

According to the methods provided herein, the subject is administered an effective amount of one or more of the agents provided herein. The terms effective amount and effective dosage are used interchangeably. The term effective amount is defined as any amount necessary to produce a desired physiologic response (e.g., reduction of inflammation). Effective amounts and schedules for administering the agent may be determined empirically by one skilled in the art. The dosage ranges for administration are those large enough to produce the desired effect in which one or more symptoms of the disease or disorder are affected (e.g., reduced or delayed). The dosage should not be so large as to cause substantial adverse side effects, such as unwanted cross-reactions, anaphylactic reactions, and the like. Generally, the dosage will vary with the age, condition, sex, type of disease, the extent of the disease or disorder, route of administration, or whether other drugs are included in the regimen, and can be determined by one of skill in the art. The dosage can be adjusted by the individual physician in the event of any contraindications. Dosages can vary and can be administered in one or more dose administrations daily, for one or several days. Guidance can be found in the literature for appropriate dosages for given classes of pharmaceutical products. For example, for the given parameter, an effective amount will show an increase or decrease of at least 5%, 10%, 15%, 20%, 25%, 40%, 50%, 60%, 75%, 80%, 90%, or at least 100%. Efficacy can also be expressed as "-fold" increase or decrease. For example, a therapeutically effective amount can have at least a 1.2-fold, 1.5-fold, 2-fold, 5-fold, or more effect over a control. The exact dose and formulation will depend on the purpose of the treatment, and will be ascertainable by one skilled in the art using known techniques (see, e.g., Lieberman, Pharmaceutical Dosage Forms (vols. 1-3, 1992); Lloyd, The Art, Science and Technology of Pharmaceutical Compounding (1999); Remington: The Science and Practice of Pharmacy, 22nd Edition, Gennaro, Editor (2012), and Pickar, Dosage Calculations (1999)).

The provided methods may be further combined with other tumor therapies such as radiotherapy, surgery, hormone therapy and/or immunotherapy. Thus, the provided methods can further include administering one or more additional therapeutic agents to the subject. Suitable additional therapeutic agents include, but are not limited to, analgesics, anesthetics, analeptics, corticosteroids, anticholinergic agents, anticholinesterases, anticonvulsants, antineoplastic agents, allosteric inhibitors, anabolic steroids, antirheumatic agents, psychotherapeutic agents, neural blocking agents, anti-inflammatory agents, antihelmintics, antibiotics, anticoagulants, antifungals, antihistamines, antimuscarinic agents, antimycobacterial agents, antiprotozoal agents, antiviral agents, dopaminergics, hematological agents, immunological agents, muscarinics, protease inhibitors, vitamins, growth factors, and hormones. The choice of agent and dosage can be determined readily by one of skill in the art based on the given disease being treated. Optionally, the additional therapeutic agent is octreotide acetate, interferon, pembrolizumab, glucopyranosyl lipid A, carboplatin, etoposide, or any combination thereof.

In some embodiments, the additional therapeutic entity may be selected from the group consisting of a viral cancer vaccine, a bacterial cancer vaccine, a yeast cancer vaccine, N-803, an antibody, a stem cell transplant, and a tumor targeted cytokine.

Optionally, the additional therapeutic agent is a chemotherapeutic agent. A chemotherapeutic treatment regimen can include administration to a subject of one chemotherapeutic agent or a combination of chemotherapeutic agents. Chemotherapeutic agents include, but are not limited to, alkylating agents, anthracyclines, taxanes, epothilones, histone deacetylase inhibitors, inhibitors of Topoisomerase I, inhibitors of Topoisomerase II, kinase inhibitors, monoclonal antibodies, nucleotide analogs and precursor analogs, peptide antibiotics, platinum-based compounds, retinoids, and vinca alkaloids and derivatives. Optionally, the chemotherapeutic agent is carboplatin.

Combinations of agents or compositions can be administered either concomitantly (e.g., as a mixture), separately but simultaneously (e.g., via separate intravenous lines) or sequentially (e.g., one agent is administered first followed by administration of the second agent). Thus, the term combination is used to refer to concomitant, simultaneous, or sequential administration of two or more agents or compositions. The course of treatment is best determined on an individual basis depending on the particular characteristics of the subject and the type of treatment selected. The treatment, such as those disclosed herein, can be administered to the subject on a daily, twice daily, bi-weekly, monthly, or any applicable basis that is therapeutically effective. The treatment can be administered alone or in combination with any other treatment disclosed herein or known in the art. The additional treatment can be administered simultaneously with the first treatment, at a different time, or on an entirely different therapeutic schedule (e.g., the first treatment can be daily, while the additional treatment is weekly).

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. The recitation of ranges of values herein is merely intended to serve as a shorthand method of referring individually to each separate value falling within the range. Unless otherwise indicated herein, each individual value is incorporated into the specification as if it were individually recited herein.

It should further be noted that the terms "prognosing" or "predicting" a condition, a susceptibility for development of a disease, or a response to an intended treatment is meant to cover the act of predicting or the prediction (but not treatment or diagnosis of) the condition, susceptibility and/or response, including the rate of progression, improvement, and/or duration of the condition in a subject. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A recombinant nucleic acid, comprising:
   a T7 promoter sequence portion, a 5' untranslated (5'-UTR) sequence portion, a sequence portion encoding a signal peptide, a sequence portion encoding a single chain antibody fragment, a sequence portion encoding a hinge region, a sequence portion encoding a transmembrane domain, and a sequence portion encoding one or more intracellular domains; and
   wherein the nucleic acid comprises any one of SEQ ID NO: 1, SEQ ID NO: 2, SEQ ID NO: 3, or SEQ ID NO: 4.

2. The recombinant nucleic acid of claim 1, wherein the hinge provides range of motion for the single chain antibody fragment, the transmembrane domain enables insertion of a transmembrane domain into a membrane, and/or the intracellular domain provides enhanced cytotoxic activity against tumor cells.

3. The recombinant nucleic acid of claim 1, wherein the recombinant nucleic acid is in a vector.

4. The recombinant nucleic acid of claim 1, further comprising a sequence portion encoding CD16a or ER-IL2.

* * * * *

SEQUENCE LISTING

<160> NUMBER OF SEQ ID NOS: 4

<210> SEQ ID NO 1
<211> LENGTH: 7584
<212> TYPE: DNA
<213> ORGANISM: Artificial Sequence
<220> FEATURE:
<223> OTHER INFORMATION: XL53

<400> SEQUENCE: 1

```
agctgccttc tgcggggctt gccttctggc catgcccttc ttctctccct tgcacctgta      60
cctcttggtc tttgaataaa gcctgagtag gaagaaaaaa aaaaaaaaaa aaaaaagcag     120
gtggcggccg caggtaagcc agcccaggcc tcgccctcca gctcaaggcg ggacaggtgc     180
cctagagtag cctgcatcca gggacaggcc ccagccgggt gctgacacgt ccacctccat     240
ctcttcctca ggtctgcccg ggtggcatcc ctgtgacccc tccccagtgc ctctcctggt     300
cgtggaaggt gctactccag tgcccaccag ccttgtccta ataaaattaa gttgcatcat     360
tttgtttgac taggtgtcct tgtataatat tatggggtgg aggcgggtgg tatggagcaa     420
ggggcccaag ttaacttgtt tattgcagct tataatggtt acaaataaag caatagcatc     480
acaaatttca caaataaagc attttttttca ctgcattcta gttgtggttt gtccaaactc     540
atcaatgtat cttatcatgt ctggatccgc ttcaggcacc gggcttgcgg gtcatgcacc     600
aggtgcgcgg tccttcgggc acctcgacgt cggcggtgac ggtgaagccg agccgctcgt     660
agaaggggag gttgcgggc gcggaggtct ccaggaaggc gggcaccccg gcgcgctcgg     720
ccgcctccac tccggggagc acgacggcgc tgcccagacc cttgccctgg tggtcggcg      780 agacgccgac ggtggccagg aaccacgcgg gctccttggg ccggtgcggc gccaggaggc     840
cttccatctg ttgctgcgcg gccagcctgg aaccgctcaa ctcggccatg cgcggccga      900 tctcggcgaa caccgccccc gcttcgacgc tctccggcgt ggtccagacc gccaccgcgg     960
cgccgtcgtc cgcgacccac accttgccga tgtcgagccc gacgcgcgtg aggaagagtt    1020
cttgcagctc ggtgacccgc tcgatgtggc ggtccgggtc gacggtgtgg cgcgtggcgg    1080
ggtagtcggc gaacgcggcg gcgagggtgc gtacggcccg ggggacgtcg tcgcgggtgg    1140
```

```
cgaggcgcac cgtgggcttg tactcggtca tggtggcctg cagagtcgct ctgtgttcga    1200
ggccacacgc gtcaccttaa tatgcgaagt ggacctggga ccgcgccgcc ccgactgcat    1260
ctgcgtgttt tcgccaatga caagacgctg gcgggggttt gtgtcatcat agaactaaag    1320
acatgcaaat atatttcttc cggggacacc gccagcaaac gcgagcaacg ggccacgggg    1380
atgaagcagc tgcgccactc cctgaagatc catcgtctcc taacaagtta catcactcct    1440
gcccttcctc accctcatct ccatcacctc cttcatctcc gtcatctccg tcatcaccct    1500
ccgcggcagc cccttccacc ataggtggaa accagggagg caaatctact ccatcgtcaa    1560
agctgcacac agtcaccctg atattgcagg taggagcggg cttttgtcata caaggtcct    1620 taatcgcatc cttcaaaacc tcagcaaata tatgagtttg taaaaagacc atgaaataac    1680
agacaatgga ctcccttagc gggccaggtt gtgggccggg tccaggggcc attccaaagg    1740
ggagacgact caatggtgta agacgacatt gtggaatagc aagggcagtt cctcgcctta    1800
ggttgtaaag ggaggtctta ctacctccat atacgaacac accggcgacc caagttcctt    1860
cgtcggtagt cctttctacg tgactcctag ccaggagagc tcttaaacct tctgcaatgt    1920
tctcaaattt cgggttggaa cctccttgac cacgatgctt tccaaaccac cctcctttt    1980 tgcgcctgcc tccatcaccc tgaccccgc tgcgcggggg cacgtcaggc tcaccatctg    2040
ggccgccttc ttggtggtat tcaaaataat cggcttcccc tacagggtgg aaaaatggcc    2100
ttctacctgg aggggcctg cgcggtggag accggatga tgatgactga ctactgggac    2160
tcctgggcct cttttctcca cgtccacgac ctctcccct ggctctttca cgacttcccc    2220
ccctggctct ttcacgtcct ctaccccggc ggcctccact acctcctcga ccccggcctc    2280
cactacctcc tcgaccccgg cctccactgc ctcctcgacc ccggcctcca cctcctgctc    2340 ctgccctcc cgctcctgct cctgctcctg ttccaccgtg gtcccttg cagccaatgc    2400 aacttggacg tttttggggt ctccggacac catctctatg tcttggccct gatcctgagc    2460
cgcccggggc tcctggtctt ccgcctcctc gtcctcgtcc tcttccccgt cctcgtccat    2520
gtgccatgat ggcggcctgc agctgtgttc gaggccgcgc gtgtcacctt aatatgcgaa    2580
gtggacctgg gaccgcgccg ccccgactgc atctgcgtgt tcgagttcgc caatgacaag    2640
acgctgggcg gggagatccc ccttattaac cctaaacggg tagcatatgc ttcccgggta    2700
gtagtatata ctatccagac taaccctaat tcaatagcat atgttaccca acgggaagca    2760
tatgctatcg aattagggtt agtaaaaggg tcctaaggaa cagcgatctg gatagcatat    2820
gctatcctaa tctatatctg ggtagcatat gctatcctaa tctatatctg ggtagcatag    2880
gctatcctaa tctatatctg ggtagcatat gctatcctaa tctatatctg ggtagtatat    2940
gctatcctaa tttatatctg ggtagcatag gctatcctaa tctatatctg ggtagcatat    3000
gctatcctat cctcatgcat atacagtcag catatgatac ccagtagtag agtgggagtg    3060
ctatcctttg catagcccat cccgccccta actccgccca gttccgccca ttctccgcct    3120
catggctgac taatttttta ggaggctttt ttggaggcct aggcttttgc aaaaagctaa    3180
ttcggcgtaa tctgctgctt gcaaacaaaa aaaccaccgc taccagcggt ggtttgtttg    3240
ccggatcaag agctaccaac tcttttttccg aaggtaactg gcttcagcag agcgcagata    3300
ccaaatactg tccttctagt gtagccgtag ttaggccacc acttcaagaa ctctgtagca    3360
ccgcctacat acctcgctct gctgaagcca gttaccagtg ctgctgcca gtggcgataa    3420 gtcgtgtctt accgggttgg actcaagaga tagttaccgg ataaggcgca gcggtcgggc    3480
```

```
tgaacggggg gttcgtgcac acagcccagc ttggagcgaa cgacctacac cgaactgaga    3540
tacctacagc gtgagctatg agaaagcgcc acgcttcccg aagggagaaa ggcggacagg    3600
tatccggtaa gcggcagggt cggaacagga gagcgcacga gggagcttcc aggggggaaac  3660 gcctggtatc tttatagtcc tgtcgggttt cgccacctct gacttgagcg tcgatttttg   3720
tgatgctcgt caggggggcg gagcctatgg aaaaacgcca gcaacgcaag ctagagttta   3780
aacttgacag atgagacaat aaccctgata aatgcttcaa taatattgaa aaggaaaag    3840 tatgagtatt caacatttcc gtgtcgccct tattccctt tttgcggcat tttgccttcc    3900 tgttttttgct cacccagaaa cgctggtgaa agtaaaagat gcagaagatc acttgggtgc  3960
gcgagtgggt tacatcgaac tggatctcaa cagcggtaag atccttgaga gttttcgccc   4020
cgaagaacgt ttcccaatga tgagcacttt taaagttctg ctatgtggcg cggtattatc   4080
ccgtattgat gccgggcaag agcaactcgg tcgccgcata cactattctc agaatgactt   4140
ggttgaatac tcaccagtca cagaaaagca tcttacggat ggcatgacag taagagaatt   4200
atgcagtgct gccataacca tgagtgataa cactgcggcc aacttacttc tgacaactat   4260
cggaggaccg aaggagctaa ccgcttttt gcacaacatg ggggatcatg taactcgcct   4320
tgatcgttgg gaaccggagc tgaatgaagc cataccaaac gacgagcgtg acaccacgat   4380
gcctgtagca atggcaacaa cgttgcgaaa actattaact ggcgaactac ttactctagc   4440
ttcccggcaa caactaatag actggatgga ggcggataaa gttgcaggac cacttctgcg   4500
ctcggcactt ccggctggct ggtttattgc tgataaatca ggagccggtg agcgtgggtc   4560
acgcggtatc attgcagcac tggggccgga tggtaagccc tcccgtatcg tagttatcta   4620
cactacgggg agtcaggcaa ctatggatga acgaaataga cagatcgctg ataggtgc    4680 ctcactgatt aagcattggt aaggataaat ttctggtaag gaggacacgt atggaagtgg   4740
gcaagttggg gaagccgtat ccgttgctga atctggcata tgtgggagta agacgcgc     4800 agcgtcgcat caggcatttt tttctgcgcc aatgcaaaaa ggccatccgt caggatggcc   4860
tttcggcata actagtgagg ctccggtgcc cgtcagtggg cagagcgcac atcgcccaca   4920
gtccccgaga agttgggggg aggggtcggc aattgaaccg gtgcctagag aaggtggcgc   4980
ggggtaaact gggaaagtga tgtcgtgtac tggctccgcc ttttccccga gggtggggga   5040
gaaccgtata taagtgcagt agtcgccgtg aacgttcttt tcgcaacggg tttgccgcc    5100 agaacacagg taagtgccgt gtgtggttcc cgcgggcctg gcctctttac gggttatggc   5160
ccttgcgtgc cttgaattac ttccacctgg ctgcagtacg tgattcttga tcccgagctt   5220
cgggttggaa gtgggtggga gagttcgagg ccttgcgctt aaggagcccc ttcgcctcgt   5280
gcttgagttg aggcctggcc tgggcgctgg ggccgccgcg tgcgaatctg gtggcacctt   5340
cgcgcctgtc tcgctgcttt cgataagtct ctagccattt aaaattttg atgacctgct   5400 gcgacgcttt ttttctggca agatagtctt gtaaatgcgg gccaagacga tctgcacact   5460
ggtatttcgg ttttgggggc gcgggcggc gacgggccc gtgcgtccca gcgcacatgt    5520
tcggcgaggc ggggcctgcg agcgcggcca ccgagaatcg gacgggggta gtctcaagct   5580
ggccggcctg ctctggtgcc tggctcgcg ccgccgtgta tcgccccgcc ctgggcggca   5640
aggctggccc ggtcggcacc agttgcgtga gcggaaagat ggccgcttcc cggccctgct   5700
gcagggagct caaaatggag gacgcggcgc tcgggagagc gggcgggtga gtcacccaca   5760
caaaggaaaa gggcctttcc gtcctcagcc gtcgcttcat gtgactccac ggagtaccgg   5820
gcgccgtcca ggcacctcga ttagttctcg agcttttgga gtacgtcgtc tttaggttgg   5880
```

```
ggggaggggt tttatgcgat ggagtttccc cacactgagt gggtggagac tgaagttagg    5940
ccagcttggc acttgatgta attctccttg gaatttgccc ttttgagtt tggatcttgg     6000 ttcattctca agcctcagac agtggttcaa agttttttc ttccatttca ggtgtcgtga     6060
aaagctttaa tacgactcac tatagggaaa taagagagaa aagaagagta agaagaaata   6120
taagagccac catgtggttt cttactacat tgctgttgtg ggtcccggtg acggtaaca    6180 tccagatgac ccagtctcca tcttctgtgt ctgcatctgt aggagacaga gtcaccatca   6240
cttgtcgggc gagtcaggat attagccgct ggttagcctg gtatcagcag aaaccaggga   6300
aagcccctaa actcctgatc tatgctgcat ccagtttgca aagtgggtc ccatcgaggt    6360 tcagcggcag tggatctggg acagatttcg ctctcactat cagcagcctg cagcctgaag   6420
attttgcaac ttactattgt caacaggctg acagtcgttt ctcgatcacc ttcggccaag   6480
ggacacgact ggagattaaa ggcggcggag gaagcggagg cggaggatct gggggcggag   6540
gctctggcgg aggggatct gaggtgcagc tggtgcagtc tggggaggc ttggtacagc     6600 ctggggggtc cctgagactc tcctgtgcag cctctggatt caccttcagt agctatagca   6660
tgaactgggt ccgccaggct ccagggaagg gctggagtg ggtttcatac attagtagta    6720
gtagtagtac catacagtac gcagactctg tgaagggccg attcaccatc tccagagaca   6780
atgccaagaa ctcactgtat ctgcaaatga acagcctgag agacgaggac acggctgtgt   6840
attactgtgc gagagggac tactactacg gtatggacgt ctggggccaa gggaccacgg     6900
tcaccgtgag ctcaattgaa gttatgtatc ctcctcctta cctagacaat gagaagagca   6960
atggaaccat tatccatgtg aaagggaaac cctttgtcc aagtcccta tttccgggac     7020 cttctaagcc cttttgggtg ctggtggtgg ttggtggagt cctggcttgc tatagcttgc   7080
tagtaacagt ggcctttatt attttctggg tgaggagtaa gaggagcagg ctcctgcaca   7140
gtgactacat gaacatgact ccccgccgcc ccgggcccac ccgcaagcat taccagcccct  7200 atgccccacc acgcgacttc gcagcctatc gctccagagt gaagttcagc aggagcgcag   7260
acgcccccgc gtaccagcag ggccagaacc agctctataa cgagctcaat ctaggacgaa   7320
gagaggagta cgatgttttg gacaagagac gtggccggga ccctgagatg ggggaaagc    7380 cgcagagaag gaagaaccct caggaaggcc tgtacaatga actgcagaaa gataagatgg   7440
cggaggccta cagtgagatt gggatgaaag gcgagcgccg gaggggcaag gggcacgatg   7500
gcctttacca gggtctcagt acagccacca aggacaccta cgacgccctt cacatgcagg   7560
ccctgccccc tcgctgatta atta                                          7584

<210> SEQ ID NO 2
<211> LENGTH: 7709
<212> TYPE: DNA
<213> ORGANISM: Artificial Sequence
<220> FEATURE:
<223> OTHER INFORMATION: XL53-150A

<400> SEQUENCE: 2
tcaaggcggg acaggtgccc tagagtagcc tgcatccagg gacaggcccc agccgggtgc     60
tgacacgtcc acctccatct cttcctcagg tctgcccggg tggcatccct gtgacccctc   120
cccagtgcct ctcctggtcg tggaaggtgc tactccagtg cccaccagcc ttgtcctaat    180
aaaattaagt tgcatcattt tgtttgacta ggtgtccttg tataatatta tggggtggag    240
gcgggtggta tggagcaagg ggcccaagtt aacttgttta ttgcagctta taatggttac   300
```

```
aaataaagca atagcatcac aaatttcaca aataaagcat ttttttcact gcattctagt    360
tgtggtttgt ccaaactcat caatgtatct tatcatgtct ggatccgctt caggcaccgg    420
gcttgcgggt catgcaccag gtgcgcggtc cttcgggcac ctcgacgtcg gcggtgacgg    480
tgaagccgag ccgctcgtag aaggggaggt tgcgggcgc ggaggtctcc aggaaggcgg     540
gcaccccggc gcgctcggcc gcctccactc cggggagcac gacggcgctg cccagaccct    600
tgccctggtg gtcgggcgag acgccgacgg tggccaggaa ccacgcgggc tccttgggcc    660
ggtgcggcgc caggaggcct tccatctgtt gctgcgcggc cagcctggaa ccgctcaact    720
cggccatgcg cgggccgatc tcggcgaaca ccgcccccgc ttcgacgctc tccggcgtgg    780
tccagaccgc caccgcggcg ccgtcgtccg cgacccacac cttgccgatg tcgagcccga    840
cgcgcgtgag gaagagttct tgcagctcgg tgacccgctc gatgtggcgg tccgggtcga    900
cggtgtggcg cgtggcgggg tagtcggcga acgcggcggc gagggtgcgt acggcccggg    960
ggacgtcgtc gcgggtggcg aggcgcaccg tgggcttgta ctcggtcatg gtggcctgca   1020
gagtcgctct gtgttcgagg ccacacgcgt caccttaata tgcgaagtgg acctgggacc   1080
gcgccgcccc gactgcatct gcgtgttttc gccaatgaca agacgctggg cggggtttgt   1140
gtcatcatag aactaaagac atgcaaatat atttcttccg gggacaccgc cagcaaacgc   1200
gagcaacggg ccacggggat gaagcagctg cgccactccc tgaagatcca tcgtctccta   1260
acaagttaca tcactcctgc ccttcctcac cctcatctcc atcacctcct tcatctccgt   1320
catctccgtc atcaccctcc gcggcagccc cttccaccat aggtggaaac cagggaggca   1380
aatctactcc atcgtcaaag ctgcacacag tcacctgat attgcaggta ggagcgggct    1440
ttgtcataac aaggtcctta atcgcatcct tcaaaacctc agcaaatata tgagtttgta   1500
aaaagaccat gaaataacag acaatggact cccttagcgg gccaggttgt gggccgggtc   1560
caggggccat tccaaagggg agacgactca atggtgtaag acgacattgt ggaatagcaa   1620
gggcagttcc tcgccttagg ttgtaaaggg aggtcttact acctccatat acgaacacac   1680
cggcgaccca agttccttcg tcggtagtcc tttctacgtg actcctagcc aggagagctc   1740
ttaaaccttc tgcaatgttc tcaaatttcg ggttggaacc tccttgacca cgatgctttc   1800
caaaccaccc tccttttttg cgcctgcctc catcaccctg accccgctg cgcggggca     1860 cgtcaggctc accatctggg ccgccttctt ggtggtattc aaaataatcg gcttccccta   1920
cagggtggaa aaatggcctt ctacctggag ggggcctgcg cggtggagac ccggatgatg   1980
atgactgact actgggactc ctgggcctct tttctccacg tccacgacct ctcccctgg    2040 ctctttcacg acttcccccc ctggctcttt cacgtcctct accccggcgg cctccactac   2100
ctcctcgacc ccggcctcca ctacctcctc gaccccggcc tccactgcct cctgaccccc   2160
ggcctccacc tcctgctcct gccctcccg ctcctgctcc tgctcctgtt ccaccgtggg    2220
tccctttgca gccaatgcaa cttggacgtt tttggggtct ccggacacca tctctatgtc   2280
ttggccctga tcctgagccg cccggggctc ctggtcttcc gctcctcgt cctcgtcctc    2340 ttccccgtcc tcgtccatgt gccatgatgg cggcctgcag ctgtgttcga ggccgcgcgt   2400 gtcacccttaa tatgcgaagt ggacctggga ccgcgccgcc ccgactgcat ctgcgtgttc   2460
gagttcgcca atgacaagac gctgggcggg gagatccccc ttattaaccc taaacgggta   2520
gcatatgctt cccgggtagt agtatatact atccagacta accctaattc aatagcatat   2580
gttacccaac gggaagcata tgctatcgaa ttagggttag taaaagggtc ctaaggaaca   2640
gcgatctgga tagcatatgc tatcctaatc tatatctggg tagcatatgc tatcctaatc   2700
```

```
tatatctggg tagcataggc tatcctaatc tatatctggg tagcatatgc tatcctaatc    2760
tatatctggg tagtatatgc tatcctaatt tatatctggg tagcataggc tatcctaatc    2820
tatatctggg tagcatatgc tatcctatcc tcatgcatat acagtcagca tatgataccc    2880
agtagtagag tgggagtgct atcctttgca tagcccatcc cgcccctaac tccgcccagt    2940
tccgcccatt ctccgcctca tggctgacta atttttagg aggcttttt ggaggcctag     3000 gcttttgcaa aaagctaatt cggcgtaatc tgctgcttgc aaacaaaaaa accaccgcta    3060
ccagcggtgg tttgtttgcc ggatcaagag ctaccaactc ttttccgaa ggtaactggc    3120 ttcagcagag cgcagatacc aaatactgtc cttctagtgt agccgtagtt aggccaccac    3180
ttcaagaact ctgtagcacc gcctacatac ctcgctctgc tgaagccagt taccagtggc    3240
tgctgccagt ggcgataagt cgtgtcttac cgggttggac tcaagagata gttaccggat    3300
aaggcgcagc ggtcgggctg aacggggggt tcgtgcacac agcccagctt ggagcgaacg    3360
acctacaccg aactgagata cctacagcgt gagctatgag aaagcgccac gcttcccgaa    3420
gggagaaagg cggacaggta tccggtaagc ggcagggtcg aacaggaga gcgcacgagg     3480 gagcttccag ggggaaacgc ctggtatctt tatagtcctg tcgggtttcg ccacctctga    3540
cttgagcgtc gatttttgtg atgctcgtca gggggggcgga gcctatggaa aaacgccagc    3600
aacgcaagct agagtttaaa cttgacagat gagacaataa ccctgataaa tgcttcaata    3660
atattgaaaa aggaaaagta tgagtattca acatttccgt gtcgcccta ttccctttt     3720 tgcggcattt tgccttcctg ttttttgctca cccagaaacg ctggtgaaag taaaagatgc    3780
agaagatcac ttgggtgcgc gagtgggtta catcgaactg gatctcaaca gcggtaagat    3840
ccttgagagt tttcgccccg aagaacgttt cccaatgatg agcacttta aagttctgct     3900 atgtggcgcg gtattatccc gtattgatgc cgggcaagag caactcggtc gccgcataca    3960
ctattctcag aatgacttgg ttgaatactc accagtcaca gaaaagcatc ttacggatgg    4020
catgacagta agagaattat gcagtgctgc cataaccatg agtgataaca ctgcggccaa    4080
cttacttctg acaactatcg gaggaccgaa ggagctaacc gcttttttgc acaacatggg    4140
ggatcatgta actcgccttg atcgttggga accggagctg aatgaagcca taccaaacga    4200
cgagcgtgac accacgatgc ctgtagcaat ggcaacaacg ttgcgaaaac tattaactgg    4260
cgaactactt actctagctt cccggcaaca actaatagac tggatggagg cggataaagt    4320
tgcaggacca cttctgcgct cggcacttcc ggctggctgg tttattgctg ataaatcagg    4380
agccggtgag cgtgggtcac gcggtatcat tgcagcactg gggccggatg taagccctc     4440 ccgtatcgta gttatctaca ctacggggag tcaggcaact atggatgaac gaaatagaca    4500
gatcgctgag ataggtgcct cactgattaa gcattggtaa ggataaattt ctggtaagga    4560
ggacacgtat ggaagtgggc aagttgggga agccgtatcc gttgctgaat ctggcatatg    4620
tgggagtata agacgcgcag cgtcgcatca ggcattttt tctgcgccaa tgcaaaaagg    4680
ccatccgtca ggatggcctt tcggcataac tagtgaggct ccggtgcccg tcagtgggca    4740
gagcgcacat cgcccacagt ccccgagaag ttgggggag gggtcggcaa ttgaaccggt     4800 gcctagaaa ggtggcgcgg ggtaaactgg gaaagtgatg tcgtgtactg gctccgcctt     4860
tttcccgagg gtgggggaga accgtatata agtgcagtag tcgccgtgaa cgttctttt      4920 cgcaacgggt ttgccgccag aacacaggta agtgccgtgt gtggttcccg cgggcctggc    4980
ctctttacgg gttatggccc ttgcgtgcct tgaattactt ccacctggct gcagtacgtg    5040
```

```
attcttgatc ccgagcttcg ggttggaagt gggtgggaga gttcgaggcc ttgcgcttaa    5100
ggagcccctt cgcctcgtgc ttgagttgag gcctggcctg ggcgctgggg ccgccgcgtg    5160
cgaatctggt ggcaccttcg cgcctgtctc gctgctttcg ataagtctct agccatttaa    5220 aattttttgat gacctgctgc gacgcttttt ttctggcaag atagtcttgt aaatgcgggc    5280
caagacgatc tgcacactgg tatttcggtt tttggggccg cgggcggcga cggggcccgt    5340
gcgtcccagc gcacatgttc ggcgaggcgg ggcctgcgag cgcggccacc gagaatcgga    5400
cgggggtagt ctcaagctgg ccggcctgct ctggtgcctg gcctcgcgcc gccgtgtatc    5460
gccccgccct gggcggcaag gctggccgg tcggcaccag ttgcgtgagc ggaaagatgg     5520
ccgcttcccg gccctgctgc agggagctca aaatggagga cgcggcgctc gggagagcgg    5580
gcgggtgagt cacccacaca aaggaaaagg gcctttccgt cctcagccgt cgcttcatgt    5640
gactccacgg agtaccgggc gccgtccagg cacctcgatt agttctcgag cttttggagt    5700
acgtcgtctt taggttgggg ggaggggttt tatgcgatgg agtttccca cactgagtgg     5760 gtggagactg aagttaggcc agcttggcac ttgatgtaat tctccttgga atttgccctt    5820
tttgagtttg gatcttggtt cattctcaag cctcagacag tggttcaaag tttttttctt    5880
ccatttcagg tgtcgtgaaa gcttttaata cgactcacta tagggaaata agagagaaaa    5940
gaagagtaag aagaaatata agagccacca tgtggtttct tactacattg ctgttgtggg    6000
tcccggtgga cggtaacatc cagatgaccc agtctccatc ttctgtgtct gcatctgtag    6060
gagacagagt caccatcact tgtcgggcga gtcaggatat tagccgctgg ttagcctggt    6120
atcagcagaa accagggaaa gcccctaaac tcctgatcta tgctgcatcc agtttgcaaa    6180
gtggggtccc atcgaggttc agcggcagtg gatctgggac agatttcgct ctcactatca    6240
gcagcctgca gcctgaagat tttgcaactt actattgtca acaggctgac agtcgtttct    6300
cgatcacctt cggccaaggg acacgactgg agattaaagg cggcggagga agcggaggcg    6360
gaggatctgg gggcggaggc tctggcgag ggggatctga ggtgcagctg gtgcagtctg     6420
ggggaggctt ggtacagcct ggggggtccc tgagactctc ctgtgcagcc tctggattca    6480
ccttcagtag ctatagcatg aactgggtcc gccaggctcc agggaagggg ctggagtggg    6540
tttcatacat tagtagtagt agtagtacca tacagtacgc agactctgtg aagggccgat    6600
tcaccatctc cagagacaat gccaagaact cactgtatct gcaaatgaac agcctgagag    6660
acgaggacac ggctgtgtat tactgtgcga gaggggacta ctactacggt atggacgtct    6720
ggggccaagg gaccacggtc accgtgagct caattgaagt tatgtatcct cctccttacc    6780
tagacaatga gaagagtaat ggaaccatta tccatgtgaa agggaaacac ctttgtccaa    6840 gtccctatt tcccgaccct tctaagccct tttgggtgct ggtggtggtt ggtgagtcc      6900 tggcttgcta tagcttgcta gtaacagtgg cctttattat tttctgggtg aggagtaaga    6960
ggagcaggct cctgcacagt gactacatga acatgactcc ccgccgcccc gggcccaccc    7020
gcaagcatta ccagccctat gccccaccac gcgacttcgc agcctatcgc tccagagtga    7080
agttcagcag gagcgcagac gcccccgcgt accagcaggg ccagaaccag ctctataacg    7140
agctcaatct aggacgaaga gaggagtacg atgttttgga caagagacgt ggccgggacc    7200
ctgagatggg ggaaagccg cagagaagga agaaccctca ggaaggcctg tacaatgaac     7260
tgcagaaaga taagatggcg gaggcctaca gtgagattgg gatgaaaggc gagcgccgga    7320
ggggcaaggg gcacgatggc ctttaccagg gtctcagtac agccaccaag gacacctacg    7380
acgcccttca catgcaggcc ctgccccctc gctgattaat taagctgcct tctgcggggc    7440
```

| | | | | |
|---|---|---|---|---|
| ttgccttctg | gccatgccct | tcttctctcc | cttgcacctg | tacctcttgg tctttgaata | 7500 |
| aagcctgagt | aggaagggta | ccaaaaaaaa | aaaaaaaaaa | aaaaaaaaaa aaaaaaaaaa | 7560 |
| aaaaaaaaaa | aaaaaaaaaa | aaaaaaaaaa | aaaaaaaaaa | aaaaaaaaaa aaaaaaaaaa | 7620 |
| aaaaaaaaaa | aaaaaaaaaa | aaaaaaaaaa | aaaaaaaaaa | aaaaaaaaaa aagaagagct | 7680 |
| ctaggctagc | ccaggcctcg | ccctccagc | | | 7709 |

<210> SEQ ID NO 3
<211> LENGTH: 7493
<212> TYPE: DNA
<213> ORGANISM: Artificial Sequence
<220> FEATURE:
<223> OTHER INFORMATION: NKW29

<400> SEQUENCE: 3

| | | | | | |
|---|---|---|---|---|---|
| aggctccggt | gcccgtcagt | gggcagagcg | cacatcgccc | acagtccccg agaagttggg | 60 |
| ggaggggtc | ggcaattgaa | ccggtgccta | gagaaggtgg | cgcggggtaa actgggaaag | 120 |
| tgatgtcgtg | tactggctcc | gccttttcc | cgagggtggg | ggagaaccgt atataagtgc | 180 |
| agtagtcgcc | gtgaacgttc | tttttcgcaa | cgggtttgcc | gccagaacac aggtaagtgc | 240 |
| cgtgtgtggt | tcccgcgggc | ctggcctctt | tacgggttat | ggcccttgcg tgccttgaat | 300 |
| tacttccacc | tggctgcagt | acgtgattct | tgatcccgag | cttcggggttg gaagtgggtg | 360 |
| ggagagttcg | aggccttgcg | cttaaggagc | cccttcgcct | cgtgcttgag ttgaggcctg | 420 |
| gcctgggcgc | tggggccgcc | gcgtgcgaat | ctggtggcac | cttcgcgcct gtctcgctgc | 480 |
| tttcgataag | tctctagcca | tttaaaattt | ttgatgacct | gctgcgacgc ttttttttctg | 540 |
| gcaagatagt | cttgtaaatg | cgggccaaga | cgatctgcac | actggtattt cggtttttgg | 600 |
| ggccgcgggc | ggcgacgggg | cccgtgcgtc | ccagcgcaca | tgttcggcga ggcggggcct | 660 |
| gcgagcgcgg | ccaccgagaa | tcggacgggg | gtagtctcaa | gctggccggc ctgctctggt | 720 |
| gcctggcctc | gcgccgccgt | gtatcgcccc | gccctgggcg | gcaaggctgg cccggtcggc | 780 |
| accagttgcg | tgagcggaaa | gatggccgct | tcccggccct | gctgcaggga gctcaaaatg | 840 |
| gaggacgcgg | cgctcgggag | agcgggcggg | tgagtcaccc | acacaaagga aaagggcctt | 900 |
| tccgtcctca | gccgtcgctt | catgtgactc | cacggagtac | cgggcgccgt ccaggcacct | 960 |
| cgattagttc | tcgagcttttt | ggagtacgtc | gtctttaggt | tggggggagg ggttttatgc | 1020 |
| gatggagttt | ccccacactg | agtgggtgga | gactgaagtt | aggccagctt ggcacttgat | 1080 |
| gtaattctcc | ttggaatttg | ccctttttga | gtttggatct | tggttcattc tcaagcctca | 1140 |
| gacagtggtt | caaagttttt | ttcttccatt | tcaggtgtcg | tgaaaagctt taatacgact | 1200 |
| cactataggg | aaataagaga | gaaaagaaga | gtaagaagaa | atataagagc caccatgtgg | 1260 |
| tttcttacta | cattgctgtt | gtgggtcccg | gtggacggta | acatccagat gacccagtct | 1320 |
| ccatcttctg | tgtctgcatc | tgtaggagac | agagtcacca | tcacttgtcg ggcgagtcag | 1380 |
| gatattagcc | gctggttagc | ctggtatcag | cagaaaccag | ggaaagcccc taaactcctg | 1440 |
| atctatgctg | catccagttt | gcaaagtggg | gtcccatcga | ggttcagcgg cagtggatct | 1500 |
| gggacagatt | tcgctctcac | tatcagcagc | ctgcagcctg | aagattttgc aacttactat | 1560 |
| tgtcaacagg | ctgacagtcg | tttctcgatc | accttcggcc | aagggacacg actggagatt | 1620 |
| aaaggcggcg | gaggaagcgg | aggcggagga | tctgggggcg | gaggctctgg cggaggggga | 1680 |
| tctgaggtgc | agctggtgca | gtctggggga | ggcttggtac | agcctggggg gtccctgaga | 1740 |

-continued

```
ctctcctgtg cagcctctgg attcaccttc agtagctata gcatgaactg ggtccgccag    1800
gctccaggga aggggctgga gtgggtttca tacattagta gtagtagtag taccatacag    1860
tacgcagact ctgtgaaggg ccgattcacc atctccagag acaatgccaa gaactcactg    1920
tatctgcaaa tgaacagcct gagagacgag gacacggctg tgtattactg tgcgagaggg    1980
gactactact acggtatgga cgtctggggc caagggacca cggtcaccgt gagctcaatt    2040
gaagttatgt atcctcctcc ttacctagac aatgagaaga gtaatggaac cattatccat    2100
gtgaaaggga aacacctttg tccaagtccc ctatttcccg gaccttctaa gcccttttgg    2160
gtgctggtgg tggttggtgg agtcctggct tgctatagct tgctagtaac agtggccttt    2220
attattttct gggtgaggag taagaggagc aggctcctgc acagtgacta catgaacatg    2280
actccccgcc gccccgggcc caccgcaag cattaccagc cctatgcccc accacgcgac     2340
ttcgcagcct atcgctccct gaagatccag gtccgaaagg ccgccatcac cagctacgag    2400
aagtctgatg gcgtgtacac cggcctgagc accagaaacc aggaaaccta cgagacactg    2460
aagcacgaga agccccccca gtgattaatt aagctgcctt ctgcggggct tgccttctgg    2520
ccatgccctt cttctctccc ttgcacctgt acctcttggt ctttgaataa gcctgagta    2580
ggaagggtac caaaaaaaaa aaaaaaaaaa aaaaaaaaaa aaaaaaaaaa aaaaaaaaaa    2640
aaaaaaaaaa aaaaaaaaaa aaaaaaaaaa aaaaaaaaaa aaaaaaaaaa aaaaaaaaaa    2700
aaaaaaaaaa aaaaaaaaaa aaaaaaaaaa aaaaaaaaaa agaagagctc taggctagcc    2760
caggcctcgc cctccagctc aaggcgggac aggtgcccta gagtagcctg catccaggga    2820
caggccccag ccgggtgctg acacgtccac ctccatctct tcctcaggtc tgcccgggtg    2880
gcatccctgt gaccctcccc cagtgcctct cctggtcgtg aaggtgcta ctccagtgcc     2940
caccagcctt gtcctaataa aattaagttg catcattttg tttgactagg tgtccttgta    3000
taatattatg gggtggaggc gggtggtatg gagcaagggg cccaagttaa cttgtttatt    3060
gcagcttata atggttacaa ataaagcaat agcatcacaa atttcacaaa taaagcattt    3120
ttttcactgc attctagttg tggtttgtcc aaactcatca atgtatctta tcatgtctgg    3180
atccgcttca ggcaccgggc ttgcgggtca tgcaccaggt gcgcggtcct tcgggcacct    3240
cgacgtcggc ggtgacggtg aagccgagcc gctcgtagaa ggggaggttg cggggcgcgg    3300
aggtctccag gaaggcgggc accccggcgc gctcggccgc ctccactccg ggagcacga    3360
cggcgctgcc cagacccttg ccctggtggt cgggcgagac gccgacggtg gccaggaacc    3420
acgcgggctc cttgggccgg tgcggcgcca ggaggcctt catctgttgc tgcgcggcca    3480
gcctggaacc gctcaactcg gccatgcgcg ggccgatctc ggcgaacacc gccccgctt    3540
cgacgctctc cggcgtggtc cagaccgcca ccgcggcgcc gtcgtccgcg acccacacct    3600
tgccgatgtc gagcccgacg cgcgtgagga agagttcttg cagctcggtg acccgctcga    3660
tgtggcggtc cgggtcgacg gtgtggcgcg tggcggggta gtcggcgaac gcggcggcga    3720
gggtgcgtac ggcccggggg acgtcgtcgc gggtggcgag gcgcaccgtg gcttgtact    3780
cggtcatggt ggcctgcaga gtcgctctgt gttcgaggcc acacgcgtca ccttaatatg    3840
cgaagtggac ctgggaccgc gccgcccga ctgcatctgc gtgttttcgc caatgacaag     3900
acgctgggcg gggtttgtgt catcatagaa ctaaagacat gcaaatatat ttcttccggg    3960
gacaccgcca gcaaacgcga gcaacgggcc acggggatga agcagctgcg ccactccctg    4020
aagatccatc gtctcctaac aagttacatc actcctgccc ttcctcaccc tcatctccat    4080
cacctccttc atctccgtca tctccgtcat caccctccgc ggcagcccct tccaccatag    4140
```

-continued

```
gtggaaacca gggaggcaaa tctactccat cgtcaaagct gcacacagtc accctgatat    4200
tgcaggtagg agcgggcttt gtcataacaa ggtccttaat cgcatccttc aaaacctcag    4260
caaatatatg agtttgtaaa aagaccatga ataacagac aatggactcc cttagcgggc     4320
caggttgtgg gccgggtcca ggggccattc caaaggggag acgactcaat ggtgtaagac    4380
gacattgtgg aatagcaagg gcagttcctc gccttaggtt gtaaagggag gtcttactac    4440
ctccatatac gaacacaccg gcgacccaag ttccttcgtc ggtagtcctt tctacgtgac    4500
tcctagccag gagagctctt aaaccttctg caatgttctc aaatttcggg ttggaacctc    4560
cttgaccacg atgctttcca aaccaccctc ctttttgcg cctgcctcca tcaccctgac     4620
ccccgctgcg cgggggcacg tcaggctcac catctgggcc gccttcttgg tggtattcaa    4680
aataatcggc ttcccctaca gggtggaaaa atggccttct acctggaggg ggcctgcgcg    4740
gtggagaccc ggatgatgat gactgactac tgggactcct gggcctcttt tctccacgtc    4800
cacgacctct cccctggct ctttcacgac ttccccccct ggctctttca cgtcctctac     4860
cccggcggcc tccactacct cctcgacccc ggcctccact acctcctcga ccccggcctc    4920
cactgcctcc tcgaccccgg cctccacctc ctgctcctgc cctcccgct cctgctcctg     4980 ctcctgttcc accgtgggtc cctttgcagc caatgcaact tggacgtttt tggggtctcc    5040
ggacaccatc tctatgtctt ggccctgatc ctgagccgcc cggggctcct ggtcttccgc    5100
ctcctcgtcc tcgtcctctt cccgtcctc gtccatgtgc catgatggcg gcctgcagct     5160
gtgttcgagg ccgcgcgtgt caccttaata tgcgaagtgg acctgggacc cgccgcccc    5220 gactgcatct gcgtgttcga gttcgccaat gacaagacgc tgggcgggga gatccccctt    5280 attaaccta aacgggtagc atatgcttcc cgggtagtag tatatactat ccagactaac     5340
cctaattcaa tagcatatgt tacccaacgg gaagcatatg ctatcgaatt agggttagta    5400
aaagggtcct aaggaacagc gatctggata gcatatgcta tcctaatcta tatctgggta    5460
gcatatgcta tcctaatcta tatctgggta gcataggcta tcctaatcta tatctgggta    5520
gcatatgcta tcctaatcta tatctgggta gtatatgcta tcctaattta tatctgggta    5580
gcataggcta tcctaatcta tatctgggta gcatatgcta tcctatcctc atgcatatac    5640
agtcagcata tgatacccag tagtagagtg ggagtgctat cctttgcata gcccatcccg    5700
cccctaactc cgcccagttc cgcccattct ccgcctcatg gctgactaat tttttaggag    5760
gcttttttgg aggcctaggc ttttgcaaaa agctaattcg gcgtaatctg ctgcttgcaa    5820
acaaaaaaac caccgctacc agcggtggtt tgtttgccgg atcaagagct accaactctt    5880
tttccgaagg taactggctt cagcagagcg cagataccaa atactgtcct tctagtgtag    5940
ccgtagttag ccaccacttc aagaactctg tagcaccgc ctacatacct cgctctgctg     6000
aagccagtta ccagtggctg ctgccagtgg cgataagtcg tgtcttaccg ggttggactc    6060
aagagatagt taccggataa ggcgcagcgg tcgggctgaa cggggggttc gtgcacacag    6120
cccagcttgg agcgaacgac ctacaccgaa ctgagatacc tacagcgtga gctatgagaa    6180
agcgccacgc ttcccgaagg gagaaaggcg gacaggtatc cggtaagcgg cagggtcgga    6240
acaggagagc gcacgaggga gcttccaggg ggaaacgcct ggtatcttta tagtcctgtc    6300
gggtttcgcc acctctgact tgagcgtcga ttttgtgat gctcgtcagg ggggcggagc     6360
ctatggaaaa acgccagcaa cgcaagctag agtttaaact tgacagatga gacaataacc    6420
ctgataaatg cttcaataat attgaaaaag gaaagtatg agtattcaac atttccgtgt     6480
```

| | |
|---|---|
| cgcccttatt ccctttttg cggcattttg ccttcctgtt tttgctcacc cagaaacgct | 6540 |
| ggtgaaagta aaagatgcag aagatcactt gggtgcgcga gtgggttaca tcgaactgga | 6600 |
| tctcaacagc ggtaagatcc ttgagagttt tcgccccgaa gaacgtttcc caatgatgag | 6660 |
| cacttttaaa gttctgctat gtggcgcggt attatcccgt attgatgccg ggcaagagca | 6720 |
| actcggtcgc cgcatacact attctcagaa tgacttggtt gaatactcac cagtcacaga | 6780 |
| aaagcatctt acggatggca tgacagtaag agaattatgc agtgctgcca taaccatgag | 6840 |
| tgataacact gcggccaact tacttctgac aactatcgga ggaccgaagg agctaaccgc | 6900 |
| ttttttgcac aacatggggg atcatgtaac tcgccttgat cgttgggaac cggagctgaa | 6960 |
| tgaagccata ccaaacgacg agcgtgacac cacgatgcct gtagcaatgg caacaacgtt | 7020 |
| gcgaaaacta ttaactggcg aactacttac tctagcttcc cggcaacaac taatagactg | 7080 |
| gatggaggcg gataaagttg caggaccact tctgcgctcg gcacttccgg ctggctggtt | 7140 |
| tattgctgat aaatcaggag ccggtgagcg tgggtcacgc ggtatcattg cagcactggg | 7200 |
| gccggatggt aagccctccc gtatcgtagt tatctacact acggggagtc aggcaactat | 7260 |
| ggatgaacga aatagacaga tcgctgagat aggtgcctca ctgattaagc attggtaagg | 7320 |
| ataaatttct ggtaaggagg acacgtatgg aagtgggcaa gttggggaag ccgtatccgt | 7380 |
| tgctgaatct ggcatatgtg ggagtataag acgcgcagcg tcgcatcagg cattttttc | 7440 |
| tgcgccaatg caaaaaggcc atccgtcagg atggcctttc ggcataacta gtg | 7493 |

<210> SEQ ID NO 4
<211> LENGTH: 9496
<212> TYPE: DNA
<213> ORGANISM: Artificial Sequence
<220> FEATURE:
<223> OTHER INFORMATION: XL53-Tri-cistronic

<400> SEQUENCE: 4

| | |
|---|---|
| tgacagatga gacaataacc ctgataaatg cttcaataat attgaaaaag gaaaagtatg | 60 |
| agtattcaac atttccgtgt cgcccttatt ccctttttg cggcattttg ccttcctgtt | 120 |
| tttgctcacc cagaaacgct ggtgaaagta aaagatgcag aagatcactt gggtgcgcga | 180 |
| gtgggttaca tcgaactgga tctcaacagc ggtaagatcc ttgagagttt tcgccccgaa | 240 |
| gaacgtttcc caatgatgag cacttttaaa gttctgctat gtggcgcggt attatcccgt | 300 |
| attgatgccg ggcaagagca actcggtcgc cgcatacact attctcagaa tgacttggtt | 360 |
| gaatactcac cagtcacaga aaagcatctt acggatggca tgacagtaag agaattatgc | 420 |
| agtgctgcca taaccatgag tgataacact gcggccaact tacttctgac aactatcgga | 480 |
| ggaccgaagg agctaaccgc ttttttgcac aacatggggg atcatgtaac tcgccttgat | 540 |
| cgttgggaac cggagctgaa tgaagccata ccaaacgacg agcgtgacac cacgatgcct | 600 |
| gtagcaatgg caacaacgtt gcgaaaacta ttaactggcg aactacttac tctagcttcc | 660 |
| cggcaacaac taatagactg gatggaggcg gataaagttg caggaccact tctgcgctcg | 720 |
| gcacttccgg ctggctggtt tattgctgat aaatcaggag ccggtgagcg tgggtcacgc | 780 |
| ggtatcattg cagcactggg gccggatggt aagccctccc gtatcgtagt tatctacact | 840 |
| acggggagtc aggcaactat ggatgaacga aatagacaga tcgctgagat aggtgcctca | 900 |
| ctgattaagc attggtaagg ataaatttct ggtaaggagg acacgtatgg aagtgggcaa | 960 |
| gttggggaag ccgtatccgt tgctgaatct ggcatatgtg ggagtataag acgcgcagcg | 1020 |
| tcgcatcagg cattttttc tgcgccaatg caaaaaggcc atccgtcagg atggcctttc | 1080 |

```
ggcataacta gtgaggctcc ggtgcccgtc agtgggcaga gcgcacatcg cccacagtcc   1140
ccgagaagtt gggggagggg tcggcaatt gaaccggtgc ctagagaagg tggcgcgggg    1200
taaactggga aagtgatgtc gtgtactggc tccgcctttt tcccgagggt ggggagaac    1260 cgtatataag tgcagtagtc gccgtgaacg ttcttttcg caacgggttt gccgccagaa    1320
cacaggtaag tgccgtgtgt ggttcccgcg ggcctggcct ctttacgggt tatggcccctt   1380 gcgtgccttg aattacttcc acctggctgc agtacgtgat tcttgatccc gagcttcggg   1440
ttggaagtgg gtgggagagt tcgaggcctt gcgcttaagg agccccttcg cctcgtgctt    1500
gagttgaggc ctggcctggg cgctgggggcc gccgcgtgcg aatctggtgg caccttcgcg   1560
cctgtctcgc tgctttcgat aagtctctag ccatttaaaa tttttgatga cctgctgcga   1620
cgcttttttt ctggcaagat agtcttgtaa atgcgggcca agacgatctg cacactggta   1680
tttcggtttt tggggccgcg ggcggcgacg gggcccgtgc gtcccagcgc acatgttcgg    1740
cgaggcgggg cctgcgagcg cggccaccga gaatcggacg ggggtagtct caagctggcc   1800
ggcctgctct ggtgcctggc ctcgcgccgc cgtgtatcgc cccgccctgg gcggcaaggc   1860
tggcccggtc ggcaccagtt gcgtgagcgg aaagatggcc gcttcccggc cctgctgcag   1920
ggagctcaaa atgggaggacg cggcgctcgg gagagcgggc gggtgagtca cccacacaaa   1980
ggaaaagggc ctttccgtcc tcagccgtcg cttcatgtga ctccacggag taccgggcgc    2040
cgtccaggca cctcgattag ttctcgagct tttggagtac gtcgtctta ggttgggggg     2100 agggttttta tgcgatggag tttccccaca ctgagtgggt ggagactgaa gttaggccag    2160
cttggcactt gatgtaattc tccttggaat ttgccctttt tgagtttgga tcttggttca   2220
ttctcaagcc tcagacagtg gttcaaagtt ttttcttcc atttcaggtg tcgtgaaaag     2280
ctttaatacg actcactata gggaaataag agagaaaaga agagtaagaa gaaatataag    2340
agccaccatg tggtttctta ctacattgct gttgtgggtc ccggtggacg gtaacatcca    2400
gatgacccag tctccatctt ctgtgtctgc atctgtagga gacagagtca ccatcacttg   2460
tcgggcgagt caggatatta gccgctggtt agcctggtat cagcagaaac cagggaaagc   2520
ccctaaactc ctgatctatg ctgcatccag tttgcaaagt ggggtcccat cgaggttcag    2580
cggcagtgga tctgggacag atttcgctct cactatcagc agcctgcagc ctgaagattt    2640
tgcaacttac tattgtcaac aggctgacag tcgtttctcg atcaccttcg gccaagggac   2700
acgactggag attaaaggcg gcggaggaag cggaggcgga ggatctgggg gcggaggctc   2760
tggcggaggg ggatctgagg tgcagctggt gcagtctggg ggaggcttgg tacagcctgg   2820
ggggtccctg agactctcct gtgcagcctc tggattcacc ttcagtagct atagcatgaa   2880
ctgggtccgc caggctccag ggaaggggct ggagtgggtt tcatacatta gtagtagtag   2940
tagtaccata cagtacgcag actctgtgaa gggccgattc accatctcca gagacaatgc   3000
caagaactca ctgtatctgc aaatgaacag cctgagagac gaggacacgg ctgtgtatta   3060
ctgtgcgaga ggggactact actacggtat ggacgtctgg ggccaaggga ccacggtcac   3120
cgtgagctca attgaagtta tgtatcctcc tccttaccta gacaatgaga agagcaatgg   3180
aaccattatc catgtgaaag gaaacacct tgtccaagt cccctatttc ccggaccttc     3240
taagcccttt tgggtgctgg tggtggttgg tggagtcctg gcttgctata gcttgctagt   3300
aacagtggcc tttattattt tctgggtgag gagtaagagg agcaggctcc tgcacagtga   3360
ctacatgaac atgactcccc gccgccccgg gcccacccgc aagcattacc agccctatgc   3420
```

-continued

```
cccaccacgc gacttcgcag cctatcgctc cagagtgaag ttcagcagga gcgcagacgc    3480
ccccgcgtac cagcagggcc agaaccagct ctataacgag ctcaatctag gacgaagaga    3540
ggagtacgat gttttggaca agagacgtgg ccgggaccct gagatggggg aaagccgca    3600 gagaaggaag aaccctcagg aaggcctgta caatgaactg cagaaagata agatggcgga    3660
ggcctacagt gagattggga tgaaaggcga gcgccggagg ggcaaggggc acgatggcct    3720
ttaccagggt ctcagtacag ccaccaagga cacctacgac gcccttcaca tgcaggccct    3780
gccccctcgc ggatctggag ctactaactt cagcctgctg aagcaggctg agacgtgga    3840 ggagaaccct ggacctatgt ggcagctgct gctgcctaca gctctcctgc tgctggtgtc    3900
cgccggcatg agaaccgagg atctgcctaa ggccgtggtg ttcctggaac ccagtggta    3960 cagagtgctg gaaaggaca gcgtgaccct gaagtgccag ggcgcctaca gccccgagga    4020
caatagcacc cagtggttcc acaacgagag cctgatcagc agccaggcca gcagctactt    4080
catcgacgcc gccaccgtgg acgacagcgg cgagtataga tgccagacca acctgagcac    4140
cctgagcgac cccgtgcagc tggaagtgca catcggatgg ctgctgctgc aggccccag    4200 atgggtgttc aaagaagagg accccatcca cctgagatgc cactcttgga gaacaccgc    4260 cctgcacaaa gtgacctacc tgcagaacgg caagggcaga aagtacttcc accacaacag    4320
cgacttctac atccccaagg ccaccctgaa ggactccggc tcctacttct gcagaggcct    4380
cgtgggcagc aagaacgtgt ccagcgagac agtgaacatc accatcaccc agggcctggc    4440
cgtgtctacc atcagcagct ttttcccacc cggctaccag gtgtccttct gcctcgtgat    4500
ggtgctgctg ttcgccgtgg acaccggcct gtacttcagc gtgaaaacaa acatcagaag    4560
cagcacccgg gactggaagg accacaagtt caagtggcgg aaggacccc aggacaagtg    4620 aaattccgcc cctctccccc cccccctct ccctccccc cccctaacgt tactggccga    4680
agccgcttgg aataaggccg gtgtgcgttt gtctatatgt tattttccac catattgccg    4740
tcttttggca atgtgagggc ccggaaacct ggccctgtct tcttgacgag cattcctagg    4800
ggtctttccc ctctcgccaa aggaatgcaa ggtctgttga atgtcgtgaa ggaagcagtt    4860
cctctggaag cttcttgaag acaaacaacg tctgtagcga cccttttgcag gcagcggaac    4920 cccccacctg gcgacaggtg cctctgcggc caaaagccac gtgtataaga tacacctgca    4980
aaggcggcac aaccccagtg ccacgttgtg agttggatag ttgtggaaag agtcaaatgg    5040
ctctcctcaa gcgtattcaa caaggggctg aaggatgccc agaaggtacc ccattgtatg    5100
ggatctgatc tggggcctcg gtgcacatgc tttacatgtg tttagtcgag gttaaaaaaa    5160
cgtctaggcc ccccgaacca cggggacgtg ttttcctt gaaaacacg ataaccgcca    5220 ccatgtaccg gatgcagctg ctgagctgta tcgccctgtc tctggccctc gtgaccaaca    5280
gcgcccctac cagcagcagc accaagaaaa cccagctgca gctggaacat ctgctgctgg    5340
acctgcagat gatcctgaac ggcatcaaca actacaagaa ccccaagctg acccggatgc    5400
tgaccttcaa gttctacatg cccaagaagg ccaccgaact gaaacatctg cagtgcctgg    5460
aagaggaact gaagcccctg gaagaagtgc tgaacctggc ccagagcaag aacttccacc    5520
tgaggcccag ggacctgatc agcaacatca acgtgatcgt gctggaactg aaaggcagcg    5580
agacaacctt catgtgcgag tacgccgacg agacagctac catcgtggaa tttctgaacc    5640
ggtggatcac cttctgccag agcatcatca gcacccctgac cggctccgag aaggacgagc    5700
tgtgattaat taagctgcct tctgcggggc ttgccttctg gccatgccct tcttctctcc    5760
cttgcacctg tacctcttgg tctttgaata aagcctgagt aggaagaaaa aaaaaaaaaa    5820
```

-continued

```
aaaaaaaagc aggtggcggc cgcaggtaag ccagcccagg cctcgccctc cagctcaagg    5880
cgggacaggt gccctagagt agcctgcatc cagggacagg cccagccgg gtgctgacac     5940 gtccacctcc atctcttcct caggtctgcc cgggtggcat ccctgtgacc cctccccagt    6000
gcctctcctg gtcgtggaag gtgctactcc agtgcccacc agccttgtcc taataaaatt    6060
aagttgcatc attttgtttg actaggtgtc cttgtataat attatggggt ggaggcgggt    6120
ggtatggagc aaggggccca agttaacttg tttattgcag cttataatgg ttacaaataa    6180
agcaatagca tcacaaattt cacaaataaa gcatttttt cactgcattc tagttgtggt     6240
ttgtccaaac tcatcaatgt atcttatcat gtctggatcc gcttcaggca ccgggcttgc    6300
gggtcatgca ccaggtgcgc ggtccttcgg gcacctcgac gtcggcggtg acggtgaagc    6360
cgagccgctc gtagaagggg aggttgcggg gcgcggaggt ctccaggaag gcgggcaccc    6420
cggcgcgctc ggccgcctcc actccgggga gcacgacggc gctgcccaga cccttgccct    6480
ggtggtcggg cgagacgccg acggtggcca ggaaccacgc gggctccttg gccggtgcg    6540 gcgccaggag gccttccatc tgttgctgcg cggccagcct ggaaccgctc aactcggcca    6600
tgcgcgggcc gatctcggcg aacaccgccc ccgcttcgac gctctccggc gtggtccaga    6660
ccgccaccgc ggcgccgtcg tccgcgaccc acaccttgcc gatgtcgagc ccgacgcgcg    6720
tgaggaagag ttcttgcagc tcggtgaccc gctcgatgtg gcggtccggg tcgacggtgt    6780
ggcgcgtggc ggggtagtcg gcgaacgcgg cggcgagggt gcgtacggcc cggggacgt    6840 cgtcgcgggt ggcgaggcgc accgtgggct tgtactcggt catggtggcc tgcagagtcg    6900
ctctgtgttc gaggccacac gcgtcaccttt aatatgcgaa gtggacctgg accgcgccg    6960 ccccgactgc atctgcgtgt tttcgccaat gacaagacgc tgggcggggt ttgtgtcatc    7020
atagaactaa agacatgcaa atatatttct tccggggaca ccgccagcaa acgcgagcaa    7080
cgggccacgg ggatgaagca gctgcgccac tccctgaaga tccatcgtct cctaacaagt    7140
tacatcactc ctgcccttcc tcaccctcat ctccatcacc tccttcatct ccgtcatctc     7200
cgtcatcacc ctccgcggca gccccttcca ccataggtgg aaaccaggga ggcaaatcta    7260
ctccatcgtc aaagctgcac acagtcaccc tgatattgca ggtaggagcg ggctttgtca    7320
taacaaggtc cttaatcgca tccttcaaaa cctcagcaaa tatatgagtt tgtaaaagac    7380
ccatgaaata acagacaatg gactcccta gcgggcagg ttgtgggccg ggtccagggg      7440
ccattccaaa ggggagacga ctcaatggtg taagacgaca ttgtggaata gcaagggcag    7500
ttcctcgcct taggttgtaa agggaggtct tactacctcc atatacgaac acccggcga    7560 cccaagttcc ttcgtcggta gtccttttcta cgtgactcct agccaggaga gctcttaaac    7620
cttctgcaat gttctcaaat ttcggggttgg aacctccttg accacgatgc tttccaaacc    7680
accctccttt tttgcgcctg cctccatcac cctgaccccc gctgcgcggg ggcacgtcag    7740
gctcaccatc tgggccgcct tcttggtggt attcaaaata atcggcttcc cctacagggt    7800
ggaaaaatgg ccttctacct ggagggggcc tgcgcggtgg agacccggat gatgatgact    7860
gactactggg actcctgggc ctctttttctc cacgtccacg acctctcccc ctggctcttt    7920
cacgacttcc ccccctggct ctttcacgtc ctctaccccg gcggcctcca ctacctcctc    7980
gaccccggcc tccactacct cctcgacccc ggcctccact gcctcctcga cccggcctc     8040 cacctcctgc cctgcccct cccgtcctg ctcctgctcc tgttccaccg tgggtcccttt     8100 tgcagccaat gcaacttgga cgttttttggg gtctccggac accatctcta tgtcttggcc    8160
```

```
ctgatcctga gccgcccggg gctcctggtc ttccgcctcc tcgtcctcgt cctcttcccc    8220
gtcctcgtcc atgtgccatg atggcggcct gcagctgtgt tcgaggccgc gcgtgtcacc    8280
ttaatatgcg aagtggacct gggaccgcgc cgccccgact gcatctgcgt gttcgagttc    8340
gccaatgaca agacgctggg cggggagatc cccttatta accctaaacg ggtagcatat     8400
gcttcccggg tagtagtata tactatccag actaacccta attcaatagc atatgttacc    8460
caacgggaag catatgctat cgaattaggg ttagtaaaag ggtcctaagg aacagcgatc    8520
tggatagcat atgctatcct aatctatatc tgggtagcat atgctatcct aatctatatc    8580
tgggtagcat aggctatcct aatctatatc tgggtagcat atgctatcct aatctatatc    8640
tgggtagtat atgctatcct aatttatatc tgggtagcat aggctatcct aatctatatc    8700
tgggtagcat atgctatcct atcctcatgc atatacagtc agcatatgat acccagtagt    8760
agagtgggag tgctatcctt tgcatagccc atcccgcccc taactccgcc cagttccgcc    8820
cattctccgc ctcatggctg actaatttt taggaggctt ttttggaggc ctaggctttt    8880
gcaaaaagct aattcggcgt aatctgctgc ttgcaaacaa aaaaaccacc gctaccagcg    8940
gtggtttgtt tgccggatca agagctacca actcttttc cgaaggtaac tggcttcagc    9000
agagcgcaga taccaaatac tgtccttcta gtgtagccgt agttaggcca ccacttcaag    9060
aactctgtag caccgcctac atacctcgct ctgctgaagc cagttaccag tggctgctgc    9120
cagtggcgat aagtcgtgtc ttaccgggtt ggactcaaga gatagttacc ggataaggcg    9180
cagcggtcgg gctgaacggg gggttcgtgc acacagccca gcttggagcg aacgacctac    9240
accgaactga gatacctaca gcgtgagcta tgagaaagcg ccacgcttcc cgaagggaga    9300
aaggcggaca ggtatccggt aagcggcagg gtcggaacag gagagcgcac gagggagctt    9360 ccaggggaa acgcctggta tctttatagt cctgtcgggt ttcgccacct ctgacttgag    9420
cgtcgatttt tgtgatgctc gtcaggggg cggagcctat ggaaaaacgc cagcaacgca    9480
agctagagtt taaact                                                   9496
```